US010557927B2

(12) United States Patent
Marron et al.

(10) Patent No.: US 10,557,927 B2
(45) Date of Patent: Feb. 11, 2020

(54) LADAR RANGE RATE ESTIMATION USING PULSE FREQUENCY SHIFT

(71) Applicant: RAYTHEON COMPANY, Waltham, MA (US)

(72) Inventors: Joseph Marron, Manhattan Beach, CA (US); Louis Zellinger, Redondo Beach, CA (US); Arthur M. Newman, Sherman Oaks, CA (US); Vitaliy M. Kaganovich, Los Angeles, CA (US)

(73) Assignee: RAYTHEON COMPANY, Waltham, MA (US)

( * ) Notice: Subject to any disclaimer, the term of this patent is extended or adjusted under 35 U.S.C. 154(b) by 297 days.

(21) Appl. No.: 15/490,855

(22) Filed: Apr. 18, 2017

(65) Prior Publication Data

US 2018/0299536 A1    Oct. 18, 2018

(51) Int. Cl.
*G01S 7/48* (2006.01)
*G01S 17/58* (2006.01)
*G01S 17/10* (2006.01)
*G01S 17/02* (2006.01)

(52) U.S. Cl.
CPC .......... *G01S 7/4865* (2013.01); *G01S 7/4863* (2013.01); *G01S 17/023* (2013.01); *G01S 17/102* (2013.01); *G01S 17/58* (2013.01)

(58) Field of Classification Search
CPC .......... G01S 7/491; G01S 17/32; G01S 17/58; G01S 17/89; G01S 7/4917; G01S 17/023; G01S 17/102; G01C 3/08
See application file for complete search history.

(56) References Cited

U.S. PATENT DOCUMENTS

| 9,043,069 B1 | 5/2015 | Ferguson et al. |
| 2009/0059201 A1* | 3/2009 | Willner .................. G01S 7/491 356/5.01 |

(Continued)

FOREIGN PATENT DOCUMENTS

| WO | WO 2009/059391 A1 | 5/2009 |
| WO | WO 2010/149593 A1 | 12/2010 |

OTHER PUBLICATIONS

Brown, Myron Z. et al., "Efficient Alignment of Multiple Large, Complex LIDAR Models", Proc. of SPIE, 2006, pp. 621402-1 through 621402-8, vol. 6214.

(Continued)

*Primary Examiner* — Luke D Ratcliffe
(74) *Attorney, Agent, or Firm* — Lewis Roca Rothgerber Christie LLP

(57) ABSTRACT

A system and method for forming a range rate estimate for a target with a laser detection and ranging system including a laser transmitter and an array detector. The method includes: transmitting a plurality of laser pulses at a pulse repetition frequency; forming a one dimensional time series array corresponding to a time record of ladar return photons detected with the array detector; fitting the time series array with a superposition of a sine and a cosine of an initial value of a tentative frequency; iteratively fitting the time series array with a superposition of a sine and a cosine of the tentative frequency, and adjusting the tentative frequency until a completion criterion is satisfied at a final value of the tentative frequency.

18 Claims, 20 Drawing Sheets

(56) References Cited

U.S. PATENT DOCUMENTS

| | | | |
|---|---|---|---|
| 2009/0067286 A1* | 3/2009 | Bose .................. | G01V 1/48 367/38 |
| 2010/0271615 A1 | 10/2010 | Sebastian et al. | |
| 2015/0071566 A1 | 3/2015 | Goodman | |
| 2016/0356890 A1 | 12/2016 | Fried et al. | |
| 2017/0059684 A1* | 3/2017 | Robinson .................. | G01S 3/32 |

OTHER PUBLICATIONS

Schultz, Steven E. et al., "Low-SWaP Coincidence Processing for Geiger-mode Lidar Video", Proc. of SPIE, 2015, pp. 94650E-1 through 94650E-11, vol. 9465.

U.S. Appl. No. 15/490,857, filed Apr. 18, 2017.

U.S. Appl. No. 15/490,858, filed Apr. 18, 2017.

Vasile, et al. "Advanced Coincidence Processing of 3D Laser Radar Data", G. Bebis et al. (Eds.) ISVC 2012, Part I, LNCS 7431, 2012 (pp. 382-393).

Onana, "A Semiautomated Multilayer Picking Algorithm for Ice-Sheet Radar Echograms Applied to Ground-Based Near-Surface Data", IEEE Transactions on Geoscience and Remote Sensing, vol. 53, No. 1, Jan. 2015 (pp. 51-69).

International Search Report for related International Application No. PCT/US2018/018722, filed Feb. 20, 2018, International Search Report dated May 8, 2018 and dated May 17, 2018 (5 pgs.).

Written Opinion of the International Searching Authority for related International Application No. PCT/US2018/018722, filed Feb. 20, 2018, Written Opinion of the International Searching Authority dated May 17, 2018 (8 pgs.).

International Search Report for corresponding International Application No. PCT/US2018/018804, filed Feb. 20, 2018, International Search Report dated May 15, 2018 and dated May 25, 2018 (5 pgs.).

Written Opinion of the International Searching Authority for corresponding International Application No. PCT/US2018/018804, filed Feb. 20, 2018, Written Opinion of the International Searching Authority dated May 25, 2018 (6 pgs.).

International Search Report for related International Application No. PCT/US2018/018812, filed Feb. 20, 2018, International Search Report dated May 15, 2018 and dated May 25, 2018 (5 pgs.).

Written Opinion of the International Searching Authority for related International Application No. PCT/US2018/018812, filed Feb. 20, 2018, Written Opinion of the International Searching Authority dated May 25, 2018 (6 pgs.).

* cited by examiner

LADAR RANGE RATE ESTIMATION USING PULSE FREQUENCY SHIFT

FIELD

One or more aspects of embodiments according to the present invention relate to ladar, and more particularly to a system and method for generating high quality target characterizations using a ladar system.

BACKGROUND

A laser detection and ranging (ladar) system may be used to characterize a moving target, e.g., a target moving toward or away from the (ladar) system. The target may also be moving in a cross-range direction, and it may be rotating. When the rate at which reflected photons are received from the target is modest, photon counts may be accumulated over a relatively long period of time to improve the signal to noise ratio of the characteristics of the target that are measured. The accumulating of photon counts over a relatively long period of time may, however, result in blurring.

Thus, there is a need for an improved system and method for ladar signal processing.

SUMMARY

Aspects of embodiments of the present disclosure are directed toward a system and method for ladar signal processing. A ladar system transmits a sequence of laser pulses, and ladar return photons are detected, after reflecting from a target, by a camera including a photodiode array, which generates electrical pulses when it absorbs photons. Counts of electrical pulses are accumulated in time bins. The camera generates a frame of data (the frame including a plurality of bins) for each transmitted laser pulse. The data in the frame may then be analyzed using any of several different methods, to estimate the range and range rate of the target, the cross-range velocity and angular velocity of the target, and to generate images of the target.

According to an embodiment of the present invention there is provided a method for forming a range rate estimate for a target with a laser detection and ranging system including a laser transmitter and an array detector, the method including: transmitting a plurality of laser pulses at a pulse repetition frequency; forming a one dimensional time series array corresponding to a time record of ladar return photons detected with the array detector; fitting the time series array with a superposition of a sine and a cosine of an initial value of a tentative frequency; iteratively fitting the time series array with a superposition of a sine and a cosine of the tentative frequency, and adjusting the tentative frequency until a completion criterion is satisfied at a final value of the tentative frequency; and calculating the range rate estimate as the ratio of: a product of the speed of light and a difference between a final value of the tentative frequency and the pulse repetition frequency; and twice the pulse repetition frequency.

In one embodiment, iteratively fitting the time series array with a superposition of a sine and a cosine of a tentative frequency includes: multiplying the time series array by the cosine of the tentative frequency and integrating the product numerically to calculate a cosine coefficient; multiplying the time series array by the sine of the tentative frequency and integrating the product numerically to calculate a sine coefficient; calculating an objective function from the cosine coefficient and the sine coefficient; and adjusting the tentative frequency to an updated value at which a value of the objective function is increased.

In one embodiment, the adjusting of the tentative frequency includes adjusting the tentative frequency using a golden section search.

In one embodiment, the objective function is equal to the sum of: the square of the cosine coefficient; and the square of sine coefficient.

In one embodiment, the completion criterion is satisfied when the value of the objective function increases by less than a threshold amount during one iteration.

In one embodiment, the threshold amount is 0.01 percent of the value of the objective function.

In one embodiment, forming a one dimensional time series array includes: for each transmitted laser pulse: detecting, with an array detector, a plurality of ladar return photons from the laser pulse, each detection producing an electrical pulse; identifying, for each of the electrical pulses, a bin, of a plurality of time bins corresponding to the laser pulse, within which the electrical pulse was produced; and forming a one dimensional range histogram array having, for each bin of the plurality of bins, an element with a value equal to the number of electrical pulses produced in the array detector during a time interval corresponding to the bin; and concatenating: respective portions of the range histogram arrays; and a plurality of one dimensional arrays each consisting of a plurality of zeros, to form the one dimensional time series array, each nonzero element of the time series array being the number of pulses produced in a time interval at a time corresponding to the position of the nonzero element in the time series array.

In one embodiment, each respective portion of each range histogram array is a contiguous subset of the elements of the range histogram array selected to include a range of elements centered on an element corresponding to an initial estimate of a range to the target.

In one embodiment, Testn is a contiguous set of k bins, k being an integer greater than 1; Signaln is a contiguous set of bins beginning immediately to the right of Testn and extending to a peak bin having the largest value in the range histogram array; Backgroundn is a contiguous set of bins beginning immediately to the left of Testn and extending to the left edge of the range histogram array; the mean( ) function refers to an average of a set of bins that is the argument of the function; and left and right refer to earlier and later times, respectively.

According to an embodiment of the present invention there is provided a ladar system for forming a range rate estimate for a target, the system including: a pulsed laser transmitter configured to transmit a sequence of laser pulses at a pulse repetition frequency; a camera including an array detector; and a processing circuit, the camera and the processing circuit being together configured to form a one dimensional time series array corresponding to a time record of ladar return photons, the processing unit being configured to: fit the time series array with a superposition of a sine and a cosine of an initial value of a tentative frequency; iteratively fit the time series array with a superposition of a sine and a cosine of the tentative frequency, and adjust the tentative frequency until a completion criterion is satisfied at a final tentative frequency; and calculate the range rate estimate as the ratio of: the product of the speed of light and the difference between a final value of the tentative frequency and the pulse repetition frequency; and twice the pulse repetition frequency.

In one embodiment, iteratively fitting the time series array with a superposition of a sine and a cosine of a tentative frequency includes: multiplying the time series array by the cosine of the tentative frequency and integrating the product numerically to calculate a cosine coefficient; multiplying the time series array by the sine of the tentative frequency and integrating the product numerically to calculate a sine coefficient; calculating an objective function from the cosine coefficient and the sine coefficient; and adjusting the tentative frequency to an updated value at which a value of the objective function is increased.

In one embodiment, the adjusting of the tentative frequency includes adjusting the tentative frequency using a golden section search.

In one embodiment, the objective function is equal to the sum of: the square of the cosine coefficient; and the square of sine coefficient.

In one embodiment, the completion criterion is satisfied when the value of the objective function increases by less than a threshold amount during one iteration.

In one embodiment, the threshold amount is 0.01 percent of the value of the objective function.

In one embodiment, forming a one dimensional time series array includes: for each transmitted laser pulse: detecting, by the array detector, of a plurality of ladar return photons from the laser pulse, each detection producing an electrical pulse; identifying, by the camera, for each of the electrical pulses, a bin, of a plurality of time bins corresponding to the laser pulse, within which the electrical pulse was produced; and forming, by the processing circuit, a one dimensional range histogram array having, for each bin of the plurality of bins, an element with a value equal to the number of electrical pulses produced in the array detector during a time interval corresponding to the bin; and concatenating, by the processing circuit: respective portions of the range histogram arrays; and a plurality of one dimensional arrays each consisting of a plurality of zeros, to form the one dimensional time series array, each nonzero element of the time series array being the number of pulses produced in a time interval at a time corresponding to the position of the nonzero element in the time series array.

In one embodiment, each respective portion of each range histogram array is a contiguous subset of the elements of the range histogram array selected to include a range of elements centered on an element corresponding to an initial estimate of a range to the target.

In one embodiment, Testn is a contiguous set of k bins, k being an integer greater than 1; Signaln is a contiguous set of bins beginning immediately to the right of Testn and extending to a peak bin having the largest value in the range histogram array; Backgroundn is a contiguous set of bins beginning immediately to the left of Testn and extending to the left edge of the range histogram array; the mean( ) function refers to an average of a set of bins that is the argument of the function; and left and right refer to earlier and later times, respectively.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a system and method for operating a ladar provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
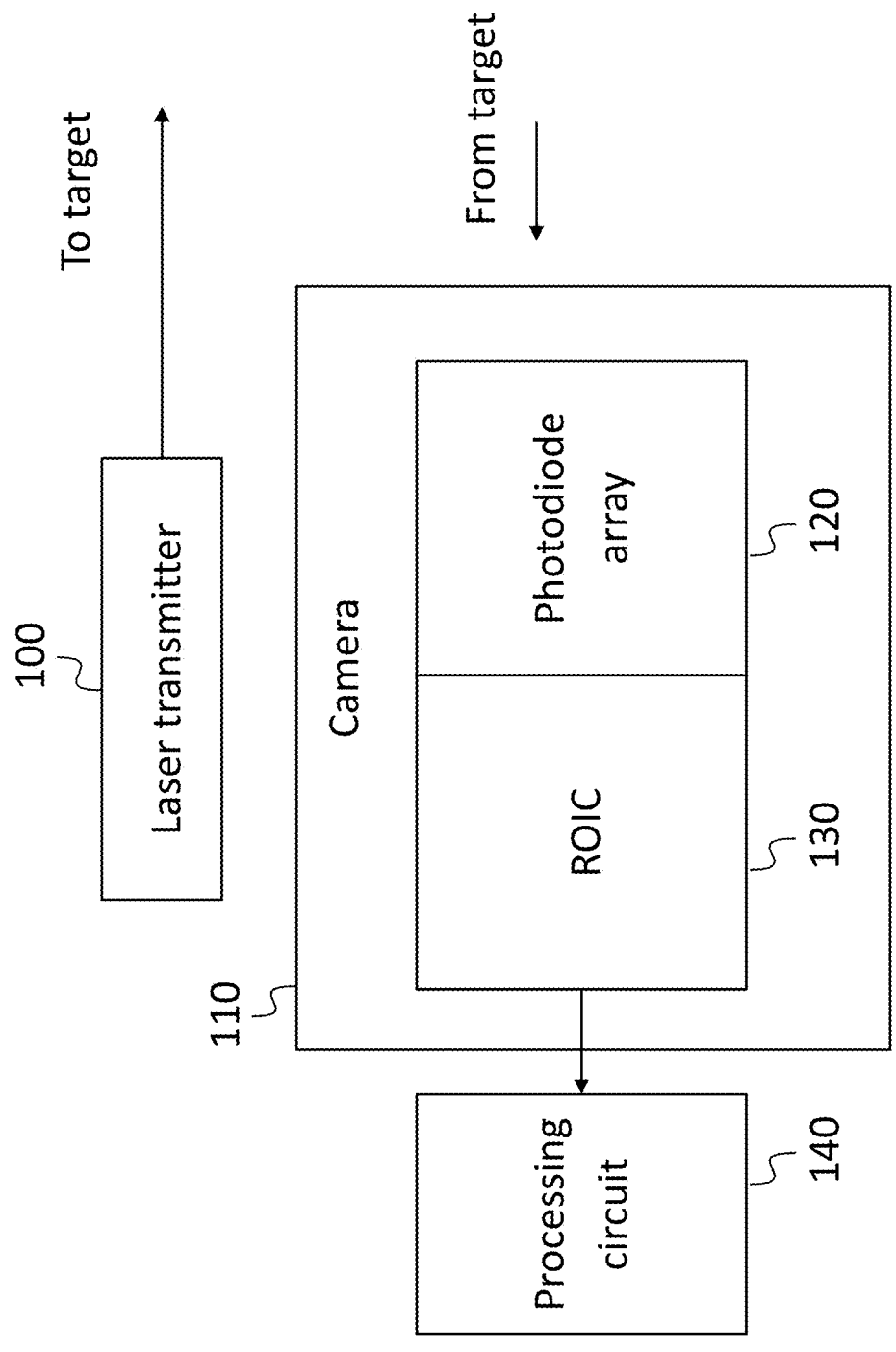
FIG. 1 is a schematic block diagram of a laser detection and ranging (ladar) system, according to an embodiment of the present invention.

Referring to FIG. 1A, a ladar system may include a laser transmitter 100 configured to transmit pulses at a pulse repetition frequency (e.g., 20 kHz), and a camera 110 including imaging optics and a Geiger-mode avalanche photodiode array 120. The Geiger-mode avalanche photodiode array 120 may detect ladar return photons that are transmitted in the pulses and reflected, from a target, into the camera 110. The photodiode array 120 may have a frame rate equal to the pulse repetition frequency, and it may be synchronized with the laser transmitter 100, so that each frame captured by the camera 110 includes only signal corresponding to a single transmitted pulse. The reciprocal of the frame rate may be referred to as the "frame period".

During any frame acquisition interval (i.e., the period of time during which the photodiode array 120 captures one frame of data), one or more of the Geiger-mode avalanche photodiodes or "detector pixels" may detect a photon, and generate a corresponding electrical pulse, which may be sensed by the readout integrated circuit (ROIC) 130. The ROIC 130 may record the time at which the electrical pulse was received, to within a certain time resolution, e.g., 1.25 ns, corresponding, for example, to a period of a clock of the ROIC 130. In each frame, the detected photons may then be classified into time bins according to their arrival times, with, e.g., the photons detected at the beginning of the frame being in bin 0, the photons detected during a time interval beginning 1.25 ns later, and ending 2.5 ns later, being in bin 1, and so on.

The output from the ROIC 130 for each frame may be a 3-dimensional array, referred to herein as the "ROIC output array", with two of the dimensions being pixel dimensions and the third dimension being bin number. Each element of the array may be either a 1 (if a photon was detected by the corresponding pixel in the corresponding time bin) or a 0 (e.g., if no photon was detected by the corresponding pixel in the corresponding time bin). Because round trip travel time corresponds to the range of the target, the time bins may also be referred to as range bins. Each avalanche photodiode may be reset once per frame, at the beginning of the frame, and each avalanche photodiode may have the characteristic that it will generate at most one electrical pulse per frame, i.e., after generating a pulse, the avalanche photodiode may be disabled for the remainder of the frame, and incapable of generating another pulse, until it is reset at the beginning of the next frame.

The electrical pulses generated by the avalanche photodiode array 120 may also include noise pulses, which may be caused by any of several mechanisms, including photons received by the camera 110 that are not ladar return photons, and dark noise (e.g., thermal noise) in the avalanche photodiode. The effects of this noise may be that (i) some elements of the ROIC output array may be 1 that in the absence of noise would have been 0, as a result of a noise pulse, and (ii) some elements of the ROIC output array may be 0 that in the absence of noise would have been 1, as a result of a pixel receiving a ladar return photon after having been disabled by a noise pulse produced earlier in the same frame.

The Geiger-mode avalanche photodiode array 120 may also operate with a range gate, i.e., a signal that enables it only during a portion of a frame, e.g., a portion corresponding to an estimated target range. The use of the range gate may reduce the effect of noise pulses that otherwise would be generated outside of the range gate time interval, e.g., well before the first ladar return photons from a given laser transmitter pulse, or well after the last ladar return photons. The ROIC output array may be sized accordingly. If, for example, the Geiger-mode avalanche photodiode array 120 has a size of 1024×1024 pixels, and if the length of the range gate is 5,000 bins, then the ROIC output array may have dimensions of 1024×1024×5000. Each 1024×1024 slice of the array corresponding to one time bin may be referred to herein as a bin slice of the ROIC output array.

The ROIC output array may be subsequently processed, e.g., by a processing circuit 140. The subsequent processing may include, for example, employing a "chipping" algorithm to discard bin slices of a ROIC output array corresponding to bins that are too early or too late to be likely to include any signals corresponding to a target of interest. The chipping algorithm may employ information in the ROIC output array (or in a set of ROIC output arrays) and may set a chipping time interval (outside of which signals are discarded) that is significantly shorter than the range gate time interval, without discarding a significant amount of data corresponding to ladar return photons. The input to the chipping algorithm, for each frame, may be a one-dimensional array of sums over the bin-slices of the frame, referred to herein as the "range histogram" or "range histogram array" for the frame (and illustrated, for example, in FIG. 6); the output of the chipping algorithm may be referred to as a "chipped range histogram" or "chipped range histogram array". The time interval corresponding to the data that are not discarded may be referred to as a "chip" for the frame.

In some embodiments a set of ROIC output arrays, e.g., a set corresponding to a contiguous set of frames, may be combined and further processed to improve the signal to noise ratio, or to obtain additional information such as a target range rate. The set of ROIC output arrays may be represented (conceptually, or in a memory of the processing circuit 140) as a four-dimensional array, referred to herein as a frame set array, with, e.g., the first two dimensions being pixel coordinates, the third dimension being bin number, and the fourth dimension being frame number. Chipping may be performed before the frame set array is formed.

Certain elements of the processing described herein as being performed in the processing circuit 140 may equally well be performed in the ROIC 130, and vice versa. System design requirements including power and heat management, and the bandwidths of interfaces between elements of the system, may influence where various processing operations are performed.

In some embodiments, the ladar system may be used to estimate the range to the target. In this case, each bin slice (or a portion of each bin slice, corresponding to the approximate location of the image of the target on the photodiode array 120) from a chip may be summed, to form a two-dimensional array referred to herein as a range versus frame array. Equivalently, the chipped range histograms may be stacked to form a two-dimensional array in which each column is a chipped range histogram for a respective frame. As used herein, the terms "row" and "column" as applied to a two dimensional array refer to the two dimensions, with the row dimension being the first dimension and the column dimension being the second dimension, or with the column dimension being the first dimension and the row dimension being the second dimension.

Figure 2A:
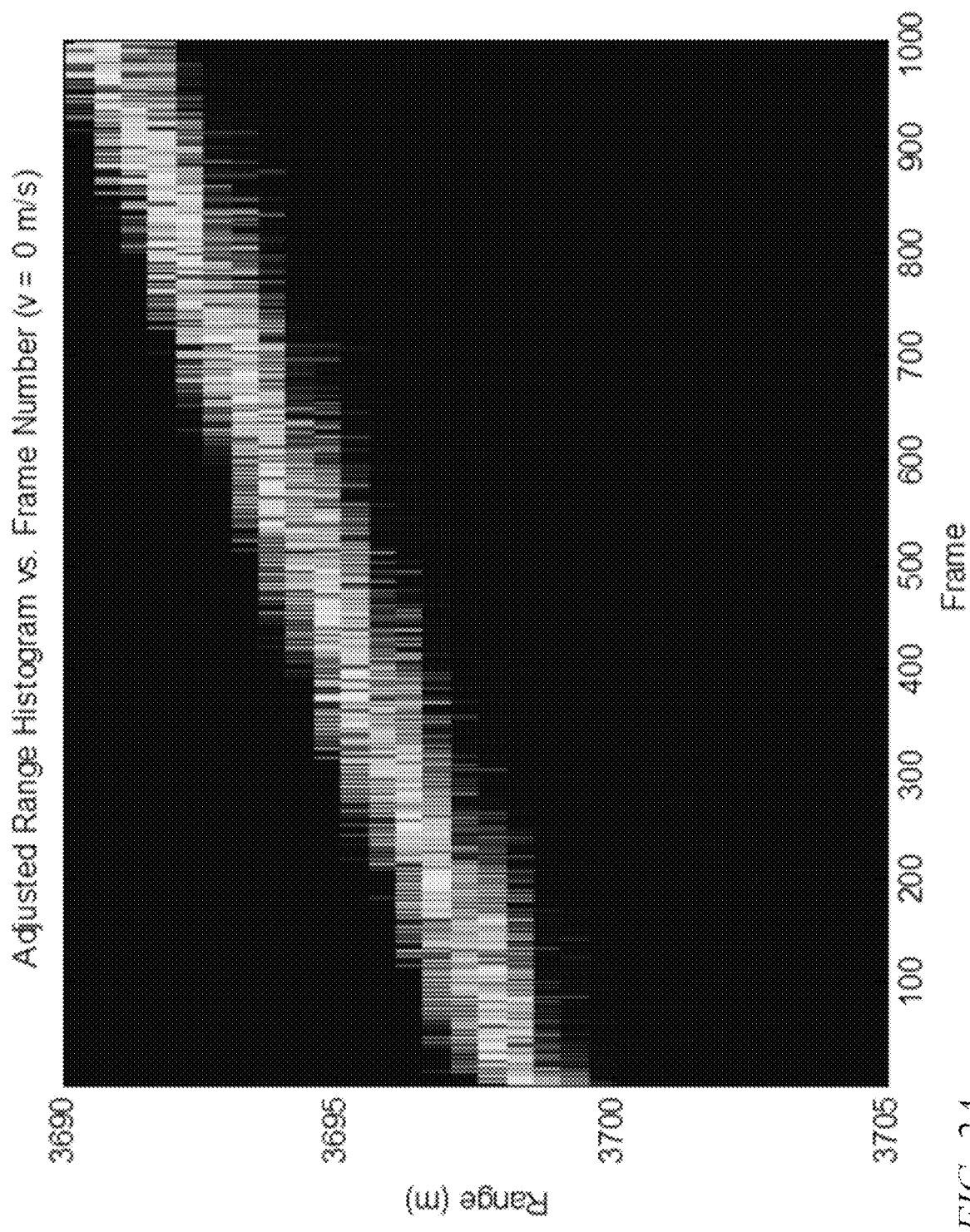
FIG. 2A is a range versus frame image for a moving target, according to an embodiment of the present invention.

FIG. 2A shows, in a grayscale image, the result of this operation for a frame set array including 1000 frames, referred to herein as a range versus frame image. Each column of the image corresponds to one frame, and each row corresponds to a time bin (which corresponds to a range bin, shown in the axis labels, and which may be used interchangeably with time bin at least in reference to FIG. 2A). Each (rectangular) pixel of the image has a brightness proportional to the corresponding bin slice. A bright diagonal line is visible in the image, corresponding to a target the range of which changes from about 3698 m to about 3691 m over the time interval corresponding to 1000 frames (e.g., over 50 ms if the frame rate is 20 kHz). The thickness of the diagonal line may correspond to the "ladar range extent" of the target, i.e., it may correspond to the extent, in the range direction, of the portions of the target that produce ladar return photons ("self-shadowed" portions of the target, i.e., portions that face away from the ladar system, not contributing to the thickness of the line).

The elements of a frame set array may also be summed along the frame number dimension. The result may be an array of sums, referred to herein as a "collapsed histogram", the array including one sum for each bin within the frame. The collapsed histogram may be graphed as a line graph (e.g., FIG. 2B), referred to herein as a "1D HRR image" (a one dimensional high range resolution image). It may also be displayed as a histogram (e.g., FIG. 2D), or referred to as a "range profile histogram".

Figure 2B:
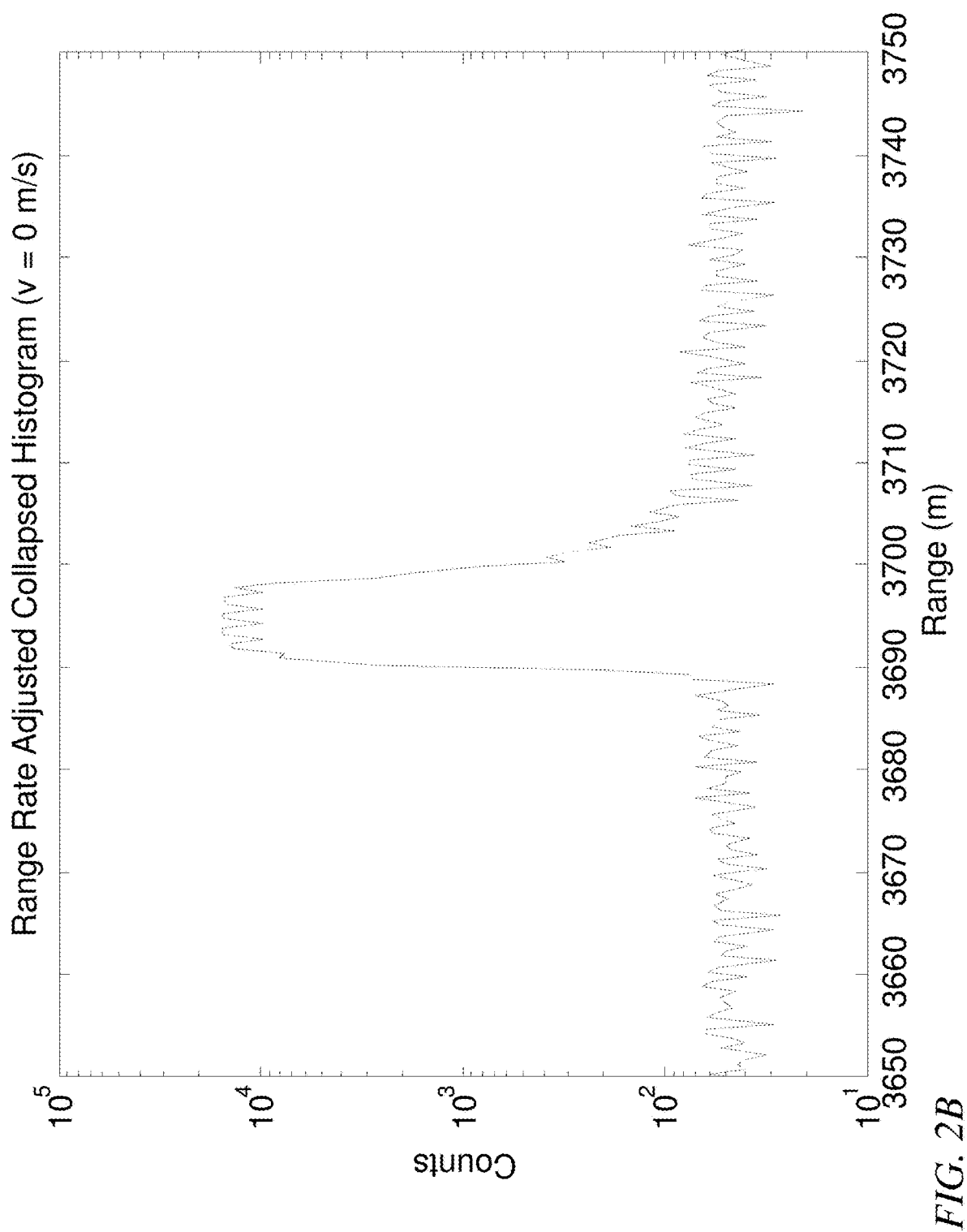
FIG. 2B is a collapsed histogram corresponding to the range versus frame image of FIG. 2A.

The line graph of FIG. 2B, being a sum of the range versus frame array along the frame number dimension (e.g., a sum along the horizontal dimension of the array illustrated in FIG. 2A) shows a peak having a width that is due in part to the ladar range extent of the target, and in part to the motion in the range direction of the target during the time interval corresponding to the frame set. The width of the peak may limit the accuracy of an estimate of the range of the target, that may be performed using the array of sums illustrated in FIG. 2B. Accordingly, a method, described in further detail below, may be used to form an alternate sum, referred to herein as a "range rate adjusted collapsed histogram", which may have a peak that is not significantly broadened by the motion of the target, and that may be used to generate a more precise target range estimate and an estimate of the target's range rate.

The method includes forming an initial range rate estimate using a Radon transform, and then iteratively improving the estimate, e.g., using an extremum-finding method such as a gradient descent method, Brent's algorithm, or a golden section search. In some embodiments the step of finding an initial range rate estimate from a Radon transform is omitted, and the initial range rate estimate is provided by another method (e.g., an initial value of 0, or an externally supplied prior estimate, may be used). The (n-dimensional) Radon transform maps a function on the n-dimensional coordinate space $R^n$ into the set of its integrals over the hyperplanes of $R^n$. For a two-dimensional coordinate space (e.g., a plane) the Radon transform maps an input image into an output image in which each point represents the integral over a straight line in the input image.

Figure 2C:
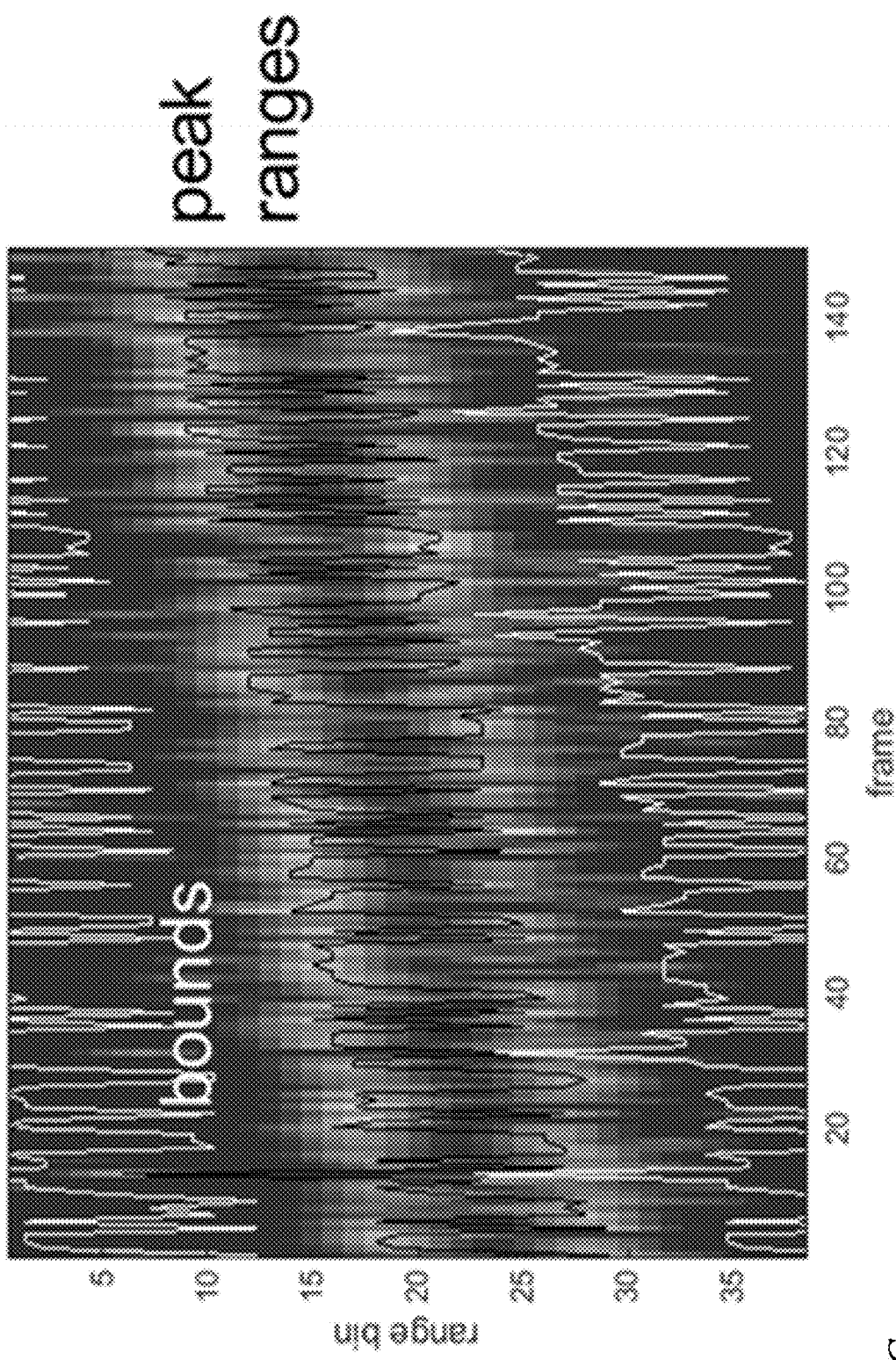
FIG. 2C is a range versus frame image for a moving target, according to an embodiment of the present invention.

FIG. 2C shows data for a case in which the target is a vehicle moving with a range rate of −200 m/s. The vehicle has two principal reflective surfaces, e.g., the front of the vehicle and the windshield of the vehicle. Accordingly, each frame (corresponding to a vertical slice, or column, of the underlying range versus frame image of FIG. 2C) shows two corresponding peaks. When the range versus frame image includes one or more diagonal bright stripes (e.g., the two diagonal stripes of FIG. 2C), the Radon transform may include one or more corresponding bright spots (represented for example as pixels with values that are larger than the average of the pixels in the image), with each bright spot corresponding to one of the one or more diagonal bright stripes.

Figure 2D:
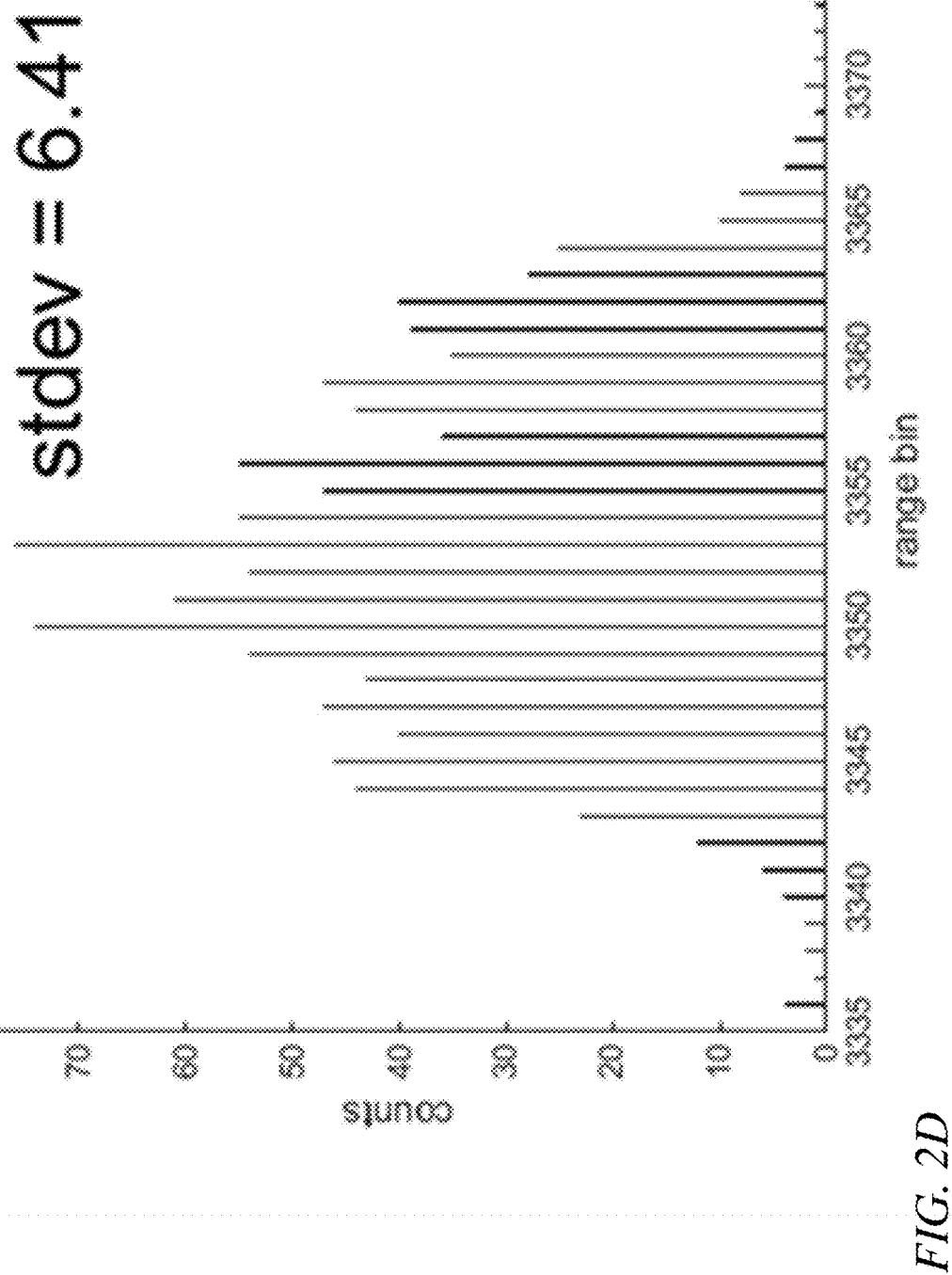
FIG. 2D is a collapsed histogram corresponding to the range versus frame image of FIG. 2C.
Figure 2E:
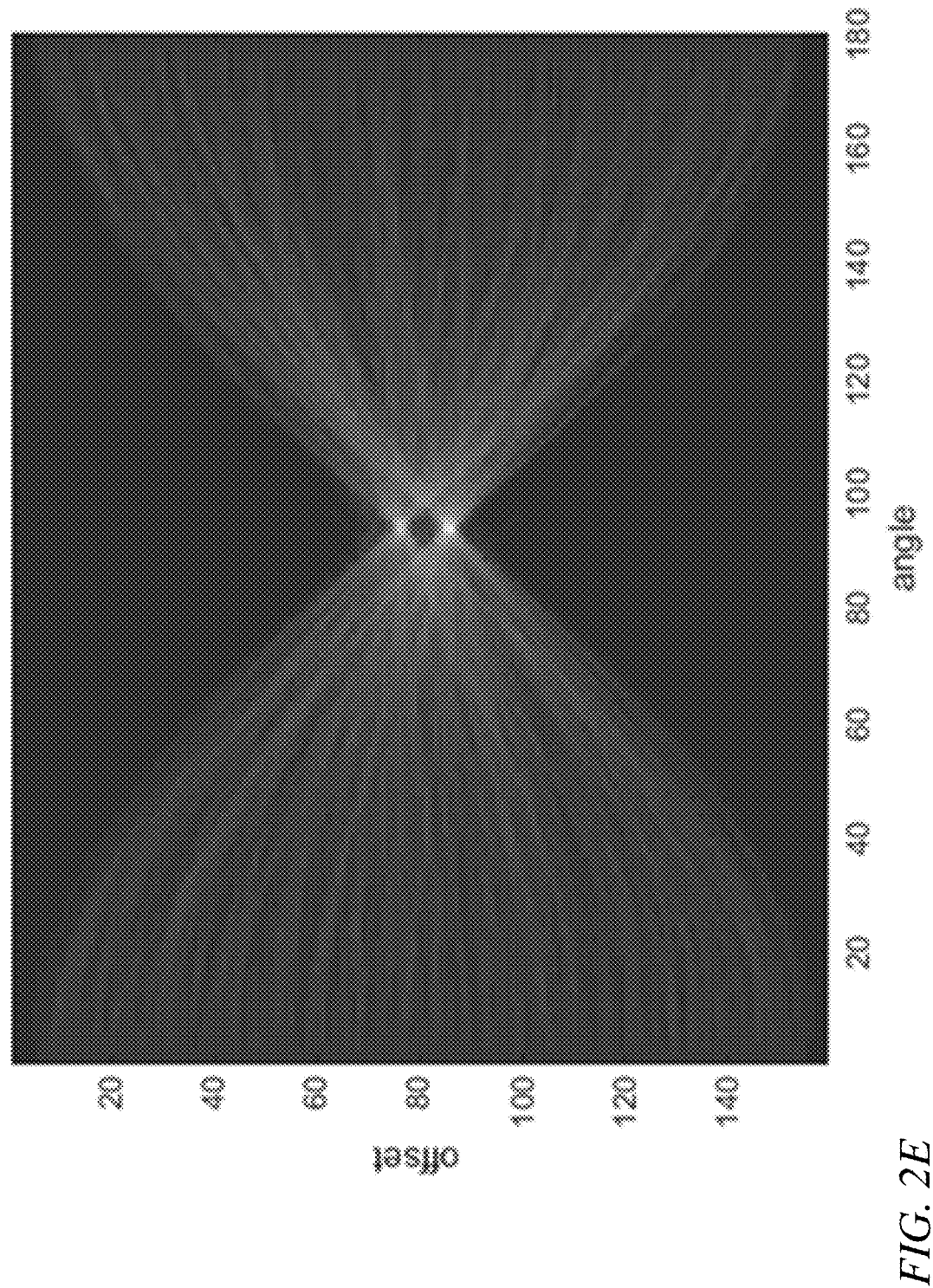
FIG. 2E is an image of a Radon transform, according to an embodiment of the present invention.

FIG. 2E shows the Radon transform of the range versus frame array illustrated as the range versus frame image of FIG. 2C. The Radon transform in FIG. 2E has two bright spots, both at an angle coordinate of about 95 degrees, and with a difference in their respective offset coordinates corresponding to the separation between the two diagonal bright stripes of FIG. 2C. Accordingly, the Radon transform makes it possible to estimate the range rate of each of the reflective surfaces of the vehicle, and its range. The Radon transform may be calculated numerically as a discrete Radon transform, resulting in a 2-dimensional array (that may be displayed, for example as the image of FIG. 2E), each element of the array corresponding to a discrete combination of offset and angle.

Figure 2F:
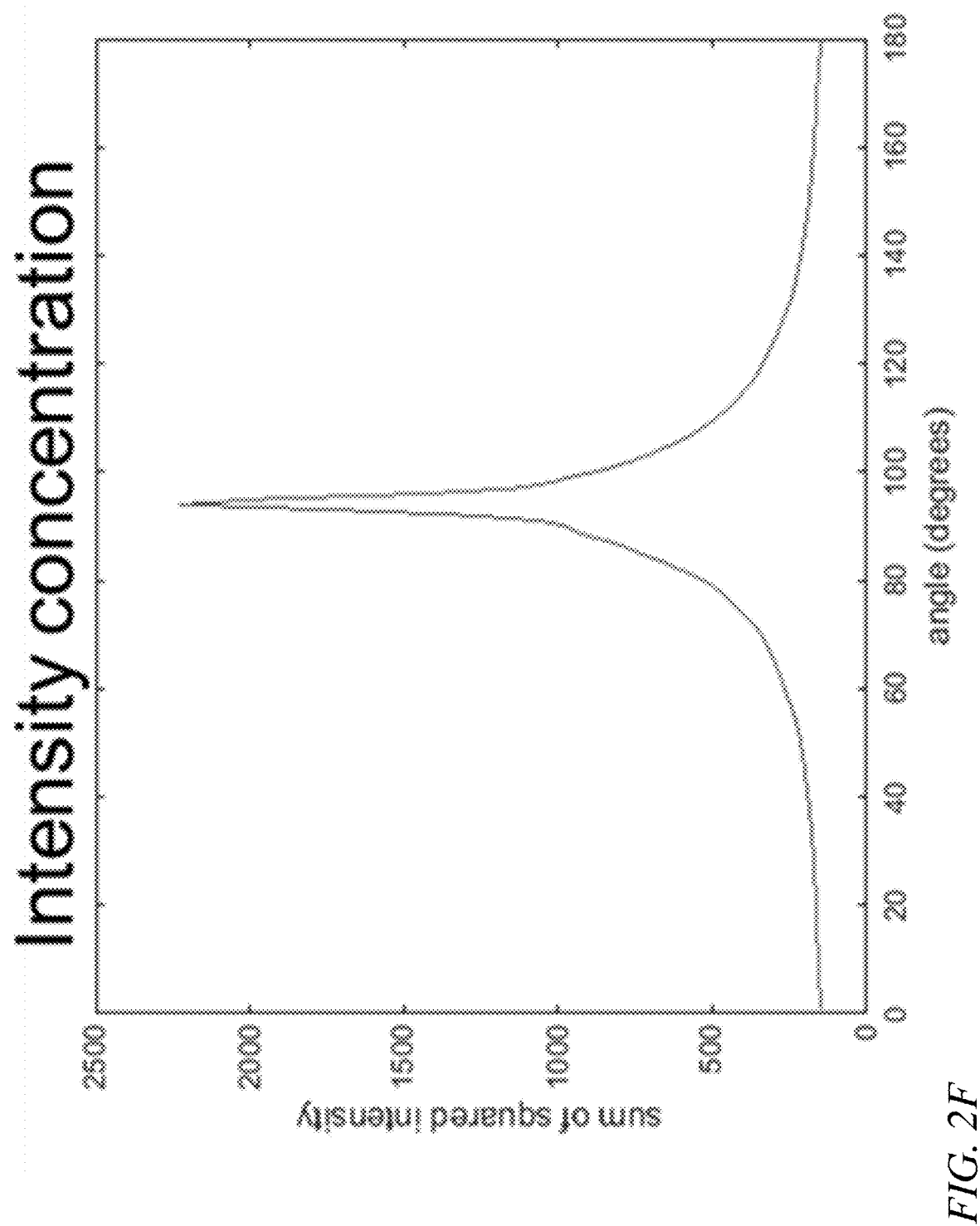
FIG. 2F is a graph of sums of the columns of the element-wise square of the Radon transform of FIG. 2E.

For example, FIG. 2F is a graph of a collapsed Radon transform array, which is the column-wise sums of the squares of the array elements (e.g., of the pixels) of the Radon transform, each sum corresponding to one of the discrete values of angle. Such a graph may show a peak at an angle corresponding to the range rate, e.g., at about 95 degrees in the case of FIGS. 2E and 2F. This process may be expressed as follows:

$$\theta_{init} = \underset{\theta}{\mathrm{argmax}} \Sigma_x R(\theta, x)^2,$$

where θ and x are the angle and offset variables in the Radon transform R(θ,x) and $\theta_{init}$ is an angle that may be used to calculate an initial estimate of the range rate, according to the following equation:

$$v = \frac{1}{2} Fc\tau \tan(90 - \theta_{init})$$

where F is the frame rate, c is the speed of light, τ is the duration of a time bin, and the angle $\theta_{init}$ is in units of degrees (as, e.g., in FIG. 2E).

The range rate estimate obtained by finding the angle at which the peak (of the column sums of the Radon transform) occurs may then be refined using an iterative process. This process may involve repeatedly calculating the range rate adjusted collapsed histogram, for various values of the estimated range rate, and, calculating a measure of the sharpness of the peak in each such range rate adjusted collapsed histogram, until a completion criterion is satisfied.

For each tentative range rate, an adjusted range versus frame array may be formed by shifting each frame of the range versus frame array in the range bin direction by an amount equal, or approximately equal, to the product of the tentative range rate and the frame period. In forming the range rate adjusted range versus frame array, a rectangular array may be formed by padding columns with zeros, or cropping the chipped range histograms, as the chipped range histograms are shifted. If the product of the tentative range rate and the frame period is, for some frames, not an integer number of bins, then interpolation may be used to generate an interpolated shifted frame, that approximates the effect of shifting the frame by a non-integer number of bins, or each frame may be shifted by an integral number of bins, the number being the nearest integer to the product of the tentative range rate and the frame period. The sum along the frame direction of the range versus frame array then forms the range rate adjusted collapsed histogram.

FIG. 2A shows an image corresponding to the (unadjusted) range versus frame array for a target moving with a range rate of −150 m/s. By definition, this is the same as the range rate adjusted range versus frame array, when the tentative range rate is 0 m/s. FIG. 2B shows a graph of the corresponding range rate adjusted collapsed histogram.

Figure 3A:
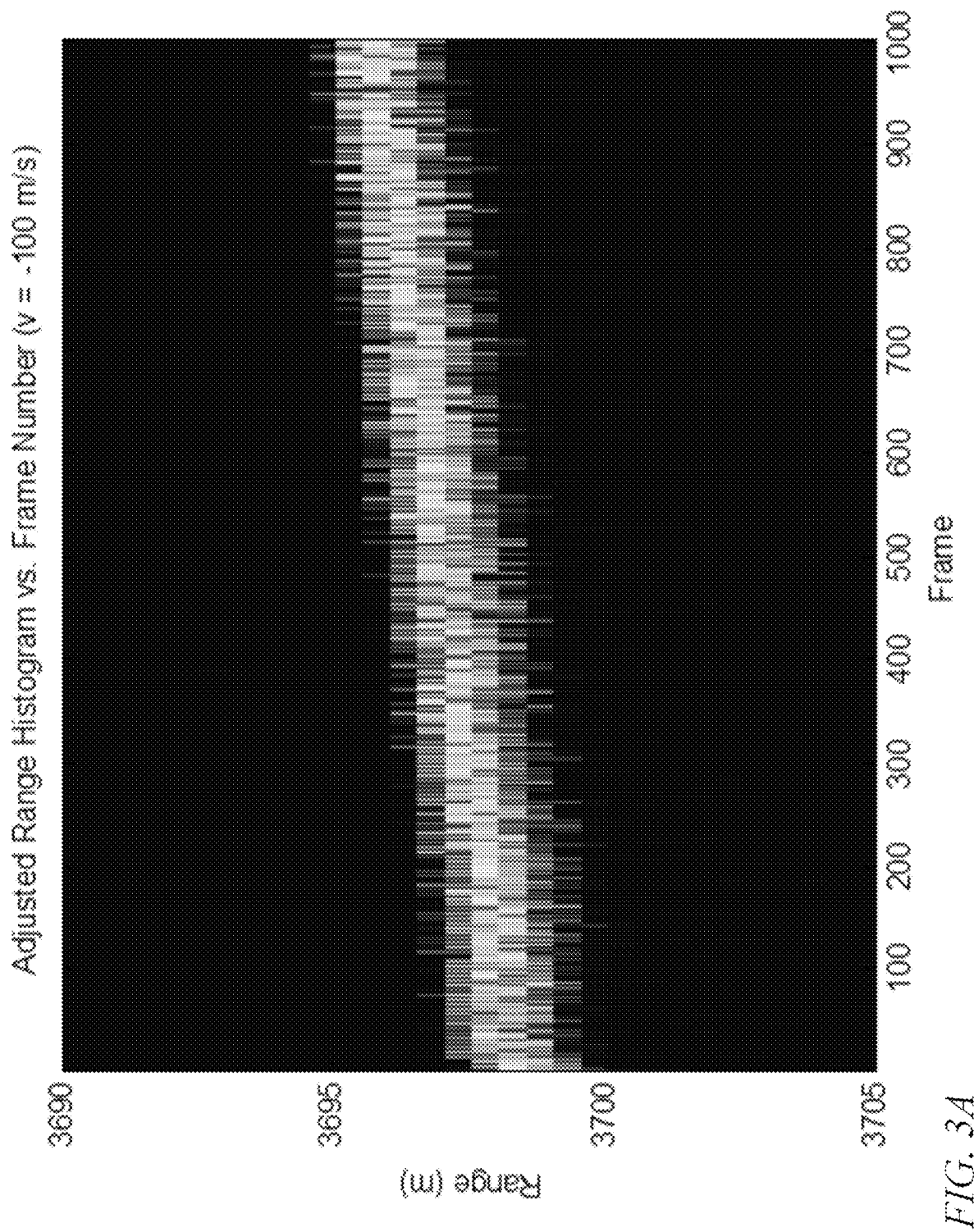
FIG. 3A is an adjusted range versus frame image for a moving target, according to an embodiment of the present invention.
Figure 3B:
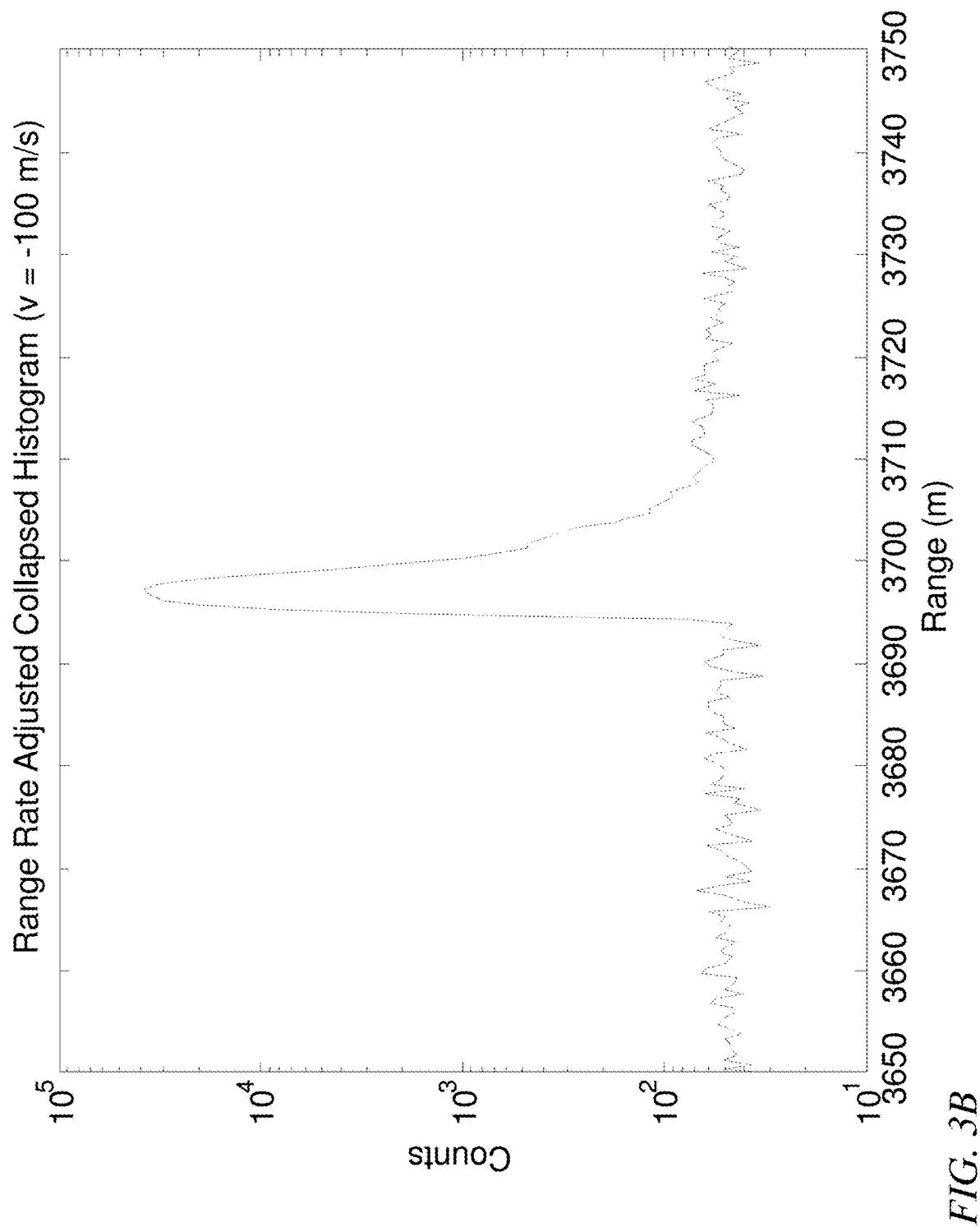
FIG. 3B is a collapsed histogram corresponding to the adjusted range versus frame image of FIG. 3A.

FIGS. 3A and 3B show the range rate adjusted range versus frame array and range rate adjusted collapsed histogram obtained, from the same range versus frame array, respectively, using a tentative range rate of −100 m/s. The slope of the diagonal line in the range rate adjusted range versus frame array of FIG. 3A is closer to horizontal relative to that of FIG. 2A, as a result of adjusting for the tentative range rate, and the peak in the range rate adjusted collapsed histogram of FIG. 3B is sharper than that of FIG. 2B because of the reduced blur.

Figure 3C:
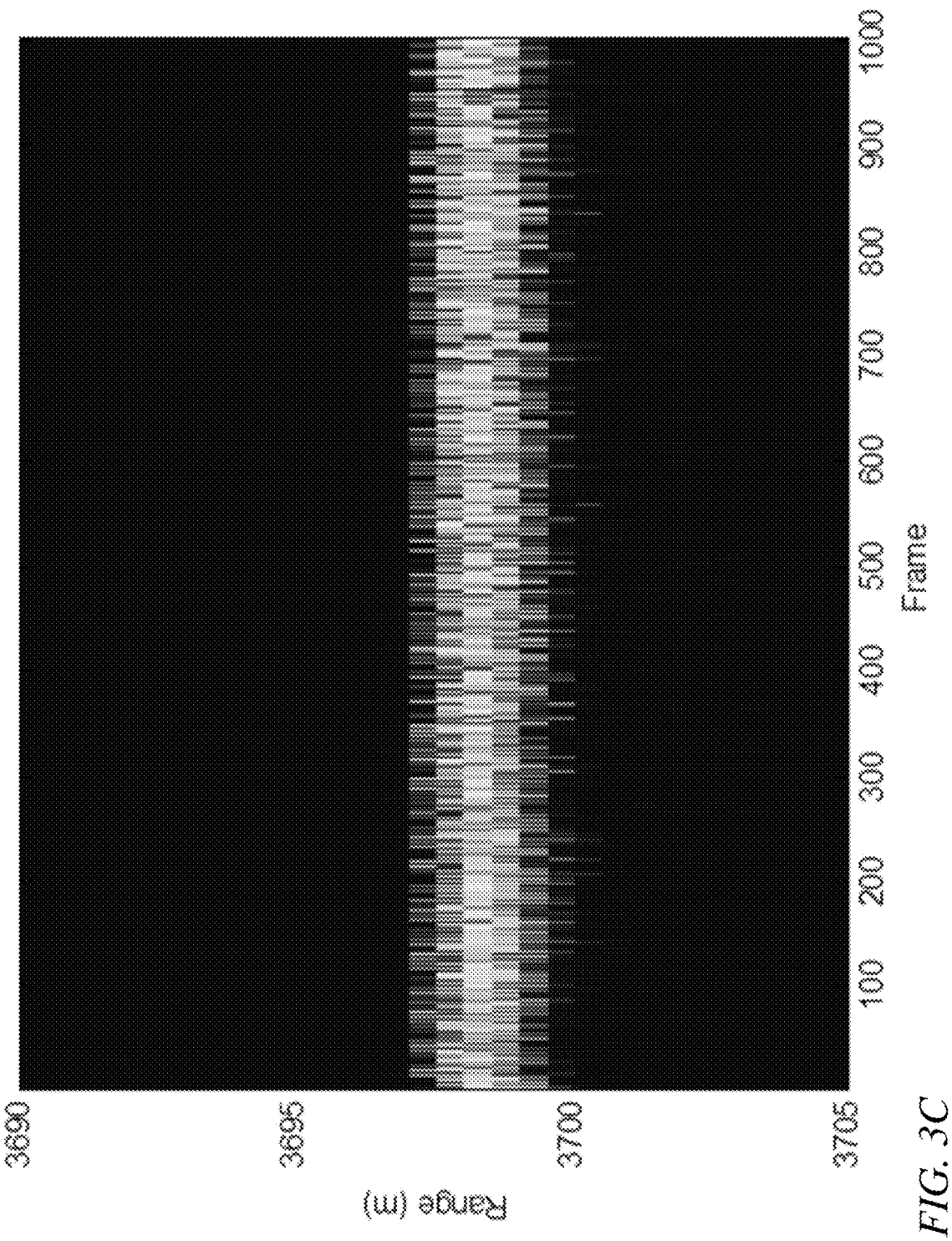
FIG. 3C is an adjusted range versus frame image for a moving target, according to an embodiment of the present invention.
Figure 3D:
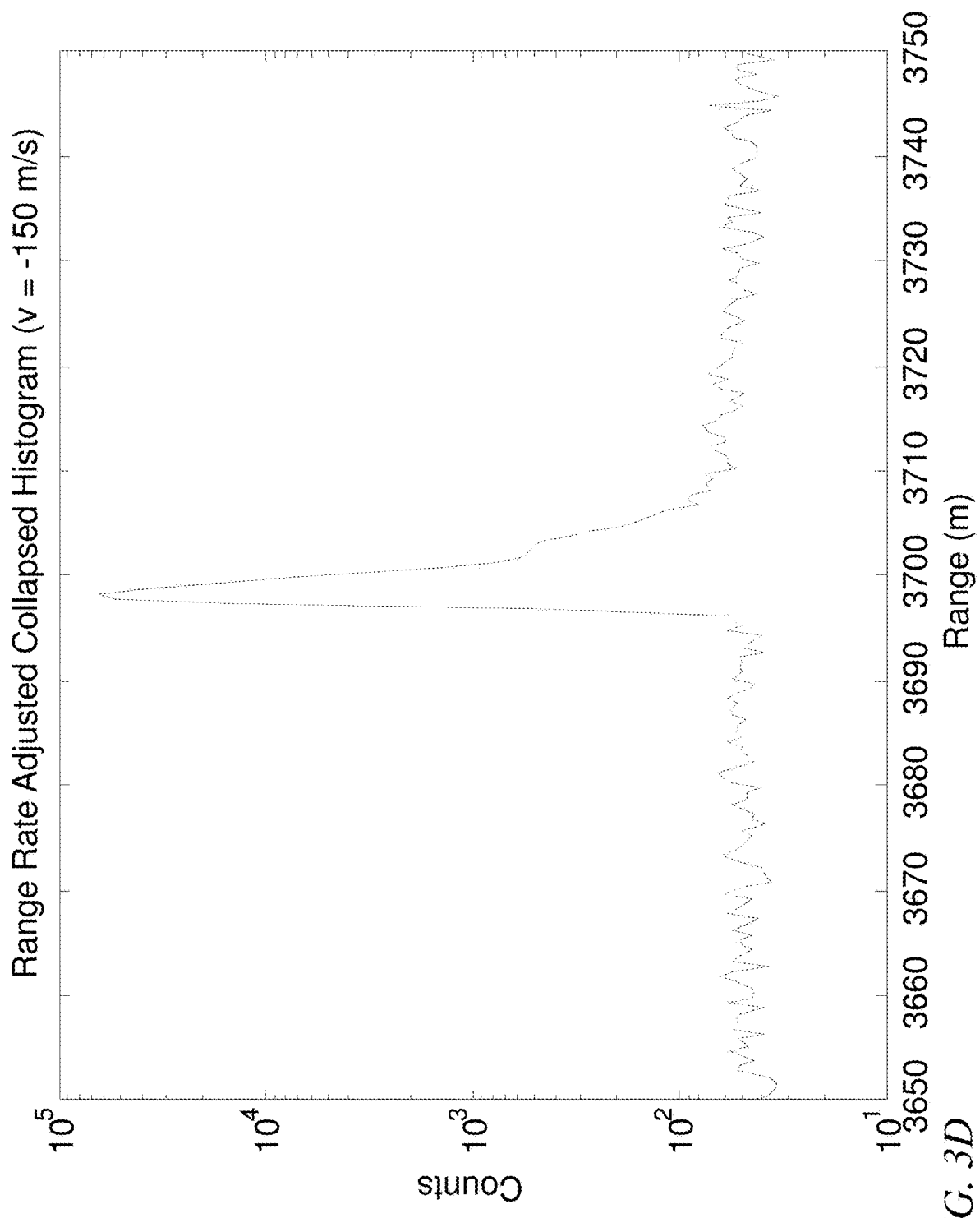
FIG. 3D is a collapsed histogram corresponding to the adjusted range versus frame image of FIG. 3C.

FIGS. 3C and 3D show the range rate adjusted range versus frame array and range rate adjusted collapsed histogram obtained, from the same range versus frame array, respectively, using a tentative range rate of −150 m/s. The slope of the diagonal line in the range rate adjusted range versus frame array of FIG. 3C is essentially zero, as a result of adjusting for the tentative range rate, and the peak in the range rate adjusted collapsed histogram of FIG. 3D is significantly sharper than in FIG. 3B and FIG. 2B because essentially all of the motion blur has been removed.

Figure 3E:
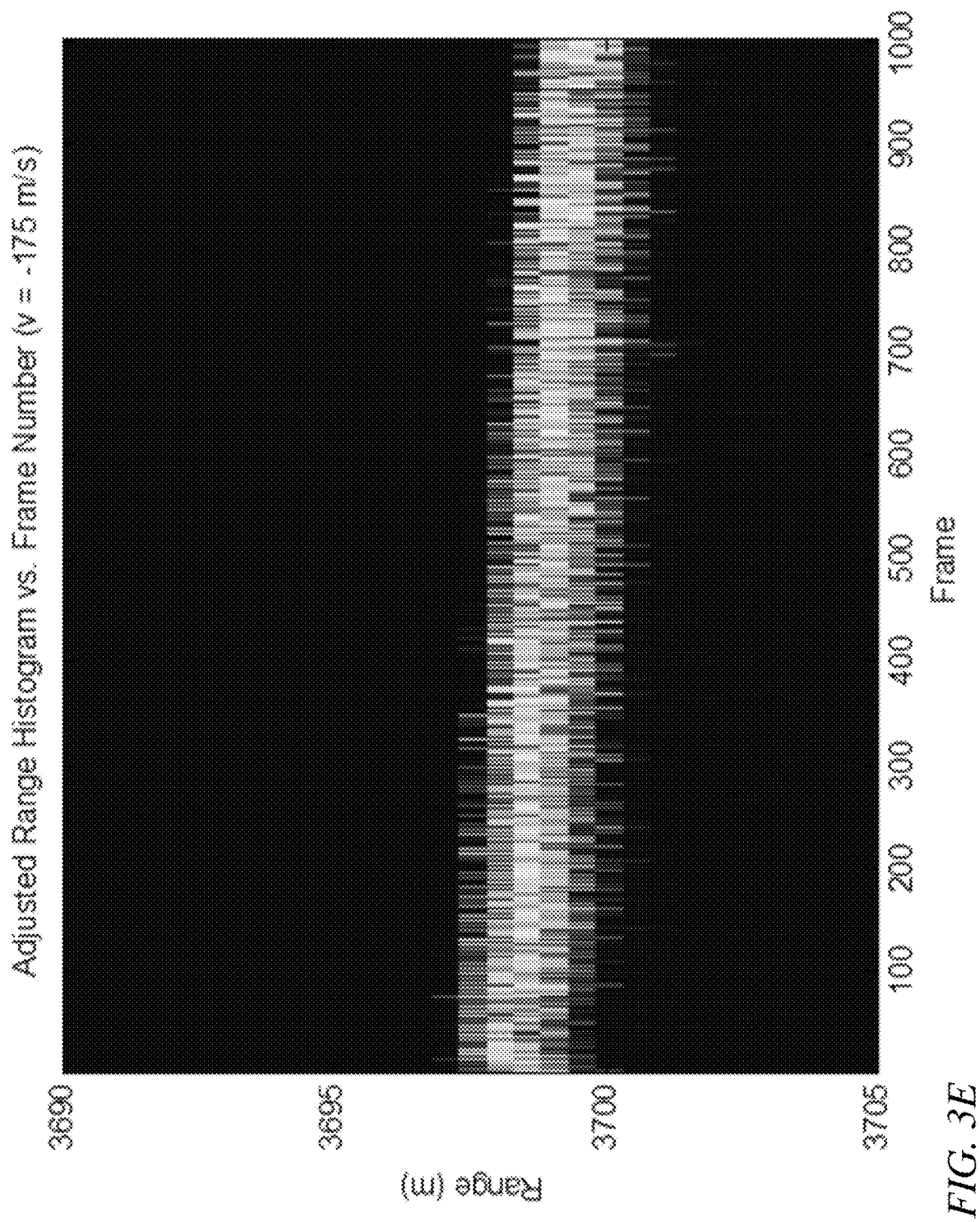
FIG. 3E is an adjusted range versus frame image for a moving target, according to an embodiment of the present invention.
Figure 3F:
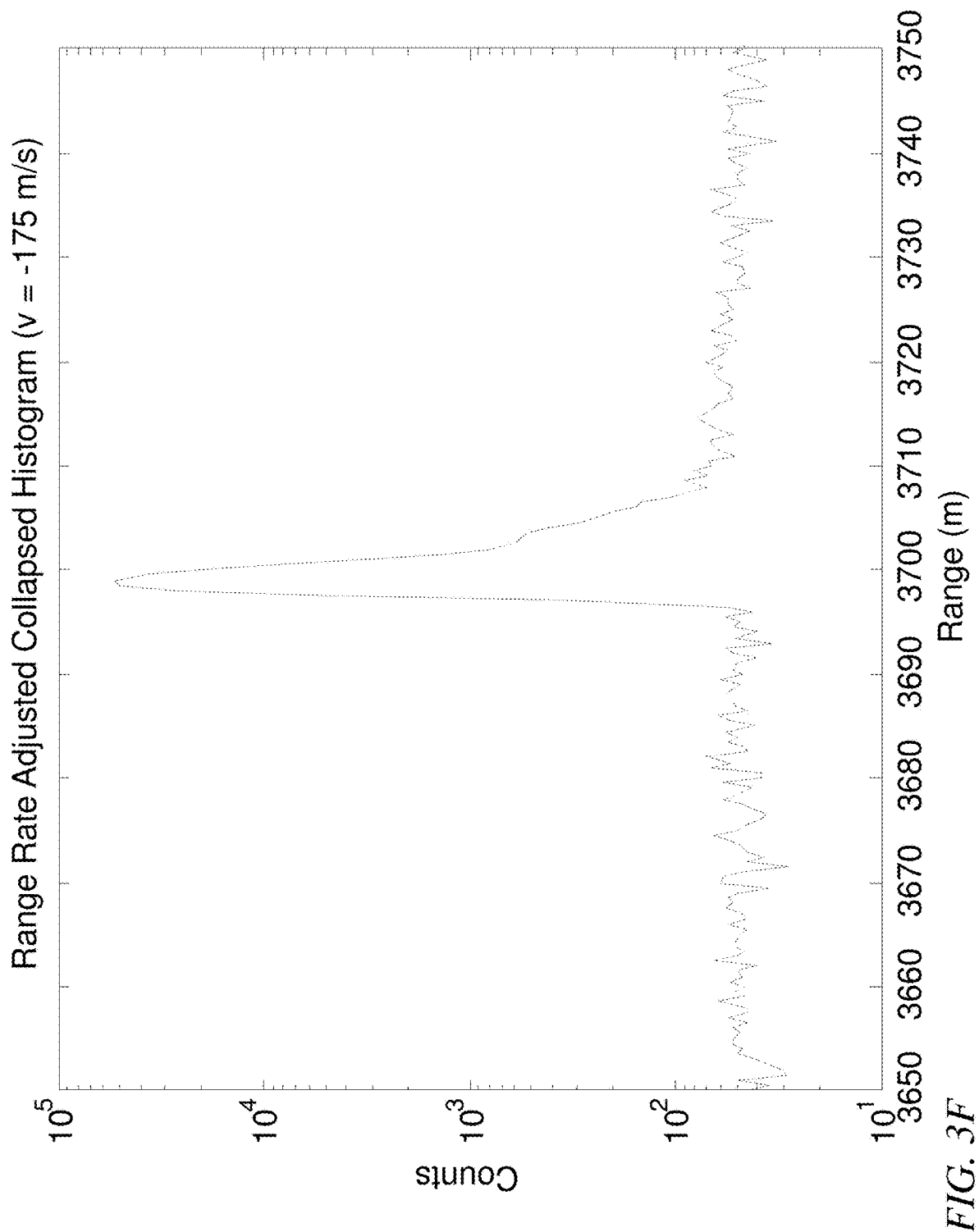
FIG. 3F is a collapsed histogram corresponding to the adjusted range versus frame image of FIG. 3E.

FIGS. 3E and 3F show the range rate adjusted range versus frame array and range rate adjusted collapsed histogram obtained, from the same range versus frame array, respectively, using a tentative range rate of −175 m/s. The slope of the diagonal line in the range rate adjusted range versus frame array of FIG. 3E is negative, as a result of adjusting for the tentative range rate (which in this case overcompensates for the range rate of the target), and the peak in the range rate adjusted collapsed histogram of FIG. 3F is broader than in FIG. 3D because the incorrect range rate fails to correct all of the blur.

From FIGS. 3A-3F it is apparent that, as evidenced by the sharpness of the peak of the adjusted collapsed histogram, −150 m/s is a better estimate of the range rate of the target than −50 m/s or −175 m/s. The process illustrated graphically in these figures may be readily automated by defining a sharpness metric for the peak in the adjusted collapsed histogram and executing a maximum-finding algorithm (such as a gradient descent algorithm, Brent's algorithm, or a golden section search) to find the tentative range rate for which the objective function (e.g., the sharpness metric) is maximized. This tentative range rate may then be used as the estimated target range rate, and the corresponding adjusted collapsed histogram may be used to obtain a high-precision estimate of the target range (e.g., as the range corresponding to the peak value of the adjusted collapsed histogram).

Figure 3G:
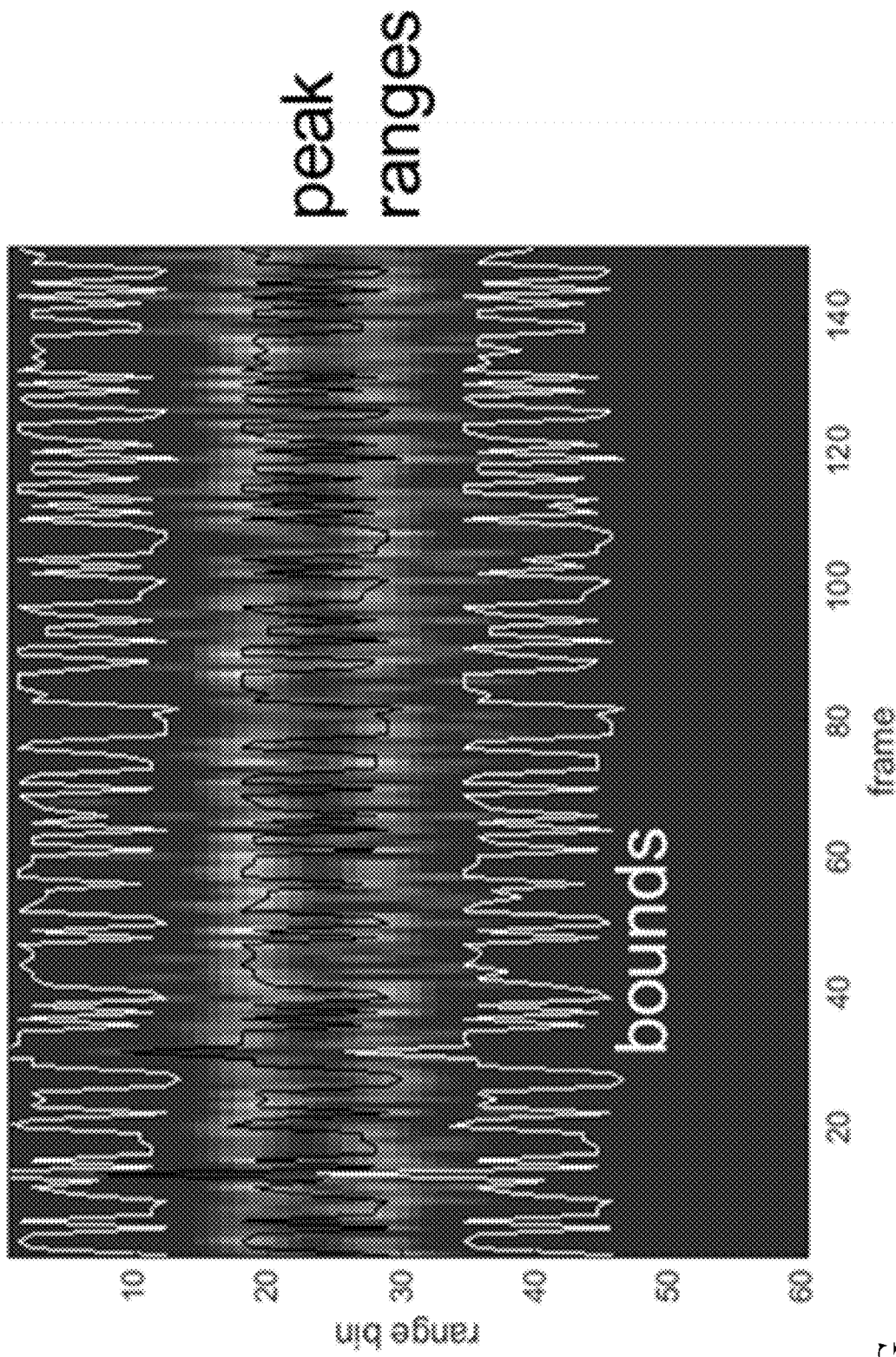
FIG. 3G is an adjusted range versus frame image for a moving target, according to an embodiment of the present invention.
Figure 3H:
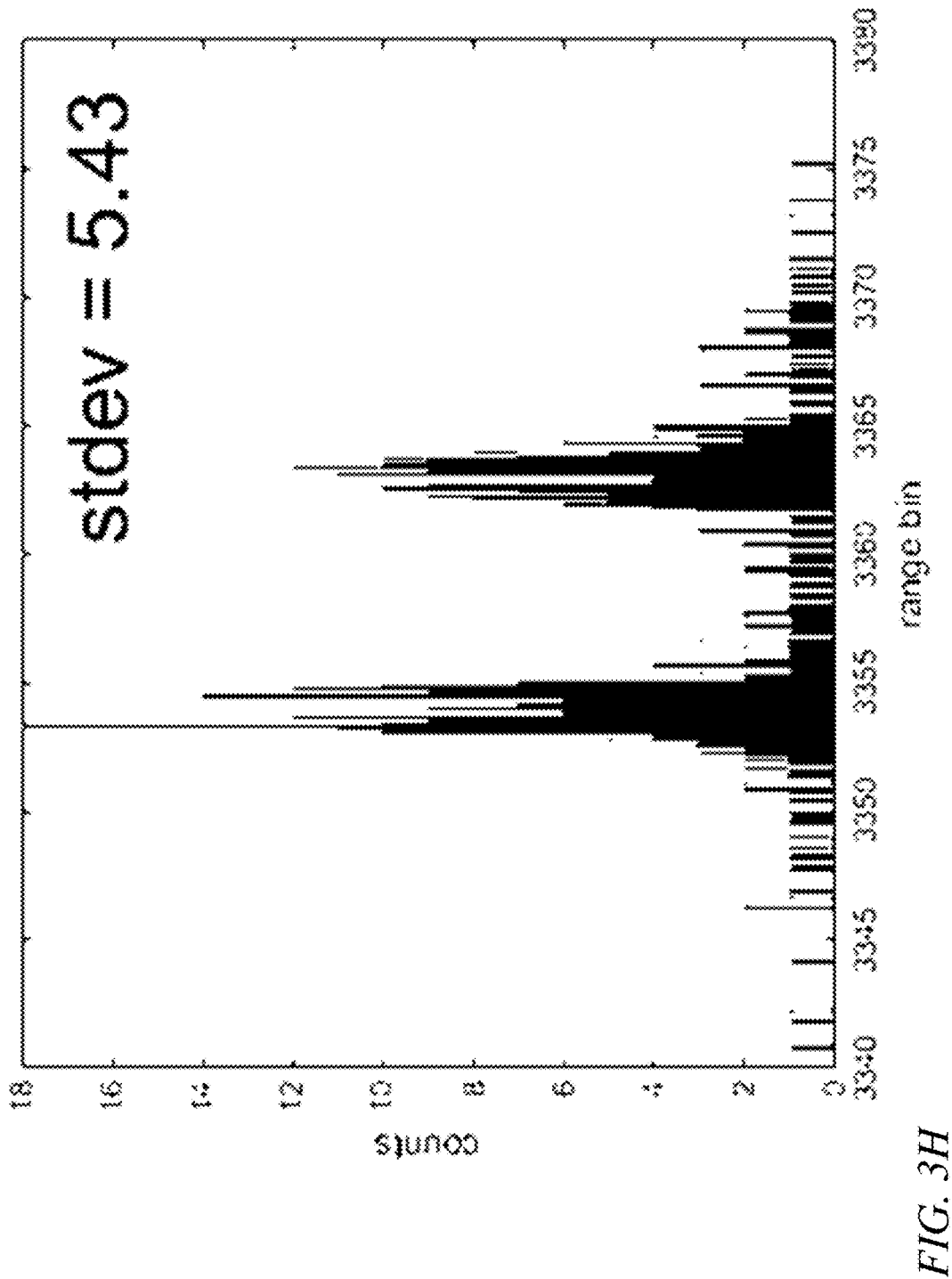
FIG. 3H is a collapsed histogram corresponding to the adjusted range versus frame image of FIG. 3G.

The method described above may also reduce blurring due to range rate for a target having, for example, two reflective portions as does (as mentioned above) the target for which a range versus frame array is illustrated in FIG. 2C, and a collapsed histogram is illustrated in FIG. 2D. FIG. 2D shows a single broad peak in part because the blur resulting from range rate is sufficient to cause the peaks corresponding to the two reflective portions of the target to merge. When a suitable adjustment is made for the target range rate, the stripes of the range rate adjusted range versus frame array become horizontal (as shown in FIG. 3G). These two horizontal stripes correspond to the two reflective portions of the target. Because of the adjustment made for the target range rate, the collapsed histogram (FIG. 3H) for the range rate adjusted range versus frame array shows two clearly resolved, sharp peaks, in contrast to the single broad peak in FIG. 2D. This improvement is analogous to the improvement obtained (as may be seen for example, by comparing the respective peaks of FIG. 2B and FIG. 3D) when the target has only one principal reflective portion.

Figure 3I:
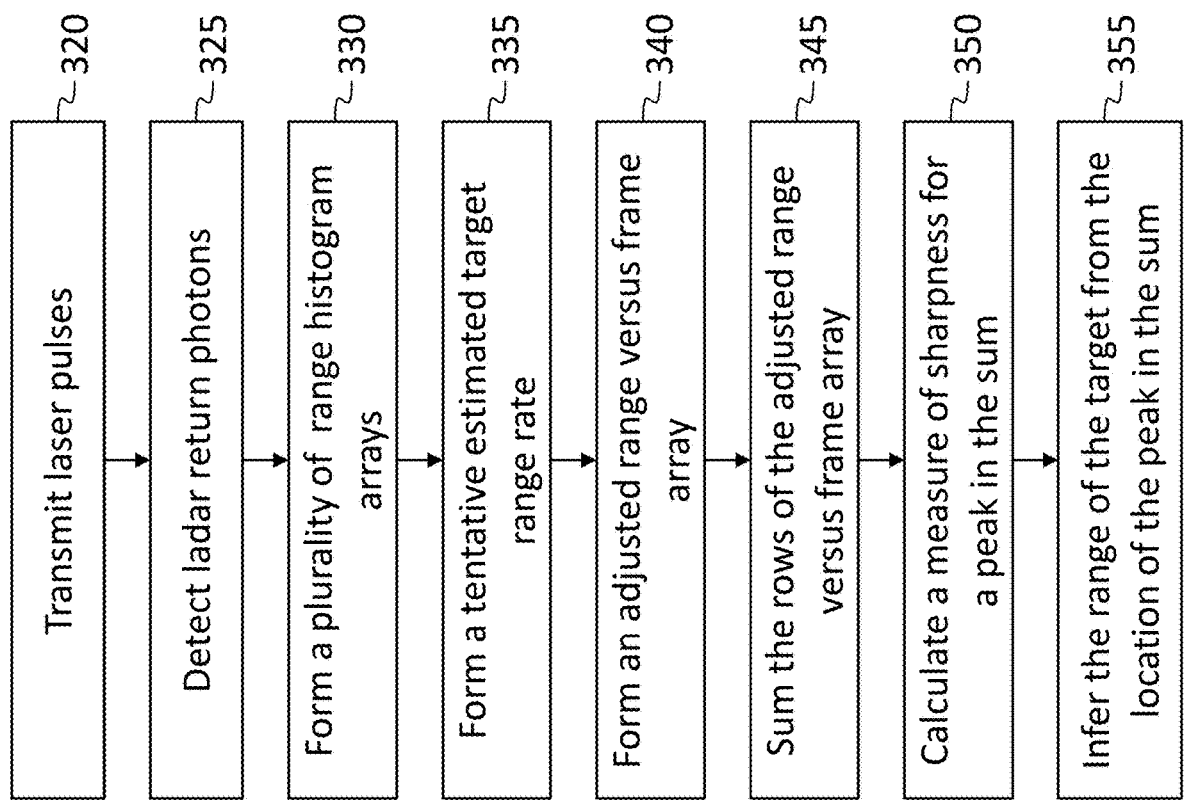
FIG. 3I is a flow chart of a method for estimating a range rate and range for a target, according to an embodiment of the present invention.

FIG. 3I is a flowchart summarizing this process of range estimation. In an act 320, a series of laser pulses is transmitted, and ladar return photons corresponding to the transmitted pulses are detected in an act 325. From the detected photons (i.e., from the detection times of the electrical pulses generated by detected photons) a plurality of range histograms is formed, in an act 330. In an act 335, a tentative target range rate is formed, e.g., using a Radon transform, as discussed in detail above. In some embodiments the initial tentative range rate is formed by another method, e.g., a constant value, such as 0 m/s, is used. In an act 340, an adjusted range versus frame array is formed by shifting each frame of the range versus frame array in the range bin direction by an amount equal, or approximately equal, to the product of the tentative range rate and the frame period. The rows of the adjusted range versus frame array are summed, in an act 345, to form a range rate adjusted collapsed histogram, and a measure of sharpness is calculated from a peak in the range rate adjusted collapsed histogram. Acts 335 through 350 may be repeated, each time with a different value of the tentative range rate, until a completion criterion is satisfied. The location of the peak in the range rate adjusted collapsed histogram may then be used, in an act 355, to infer the range of the target. The final tentative range rate may be used to infer the range rate of the target. In some embodiments the acts illustrated in FIG. 3I may not be performed sequentially but may, for example, overlap, e.g., the detection of ladar return photons corresponding to one laser pulse may occur concurrently with the transmission of subsequent laser pulses.

Various sharpness metrics may be used, including the peak value of the adjusted collapsed histogram, an integral of the adjusted collapsed histogram over a small set of range bins (e.g., a number of bins corresponding to 5 m of range) centered on the peak, or the full width at half maximum of the peak in the adjusted collapsed histogram. Other possible methods for calculating a sharpness metric include fitting the peak in the adjusted collapsed histogram to a Gaussian function, and using the reciprocal of the width of the Gaussian function as the sharpness metric, or calculating the standard deviation of the target point cloud, or the ratio of (i) the integral of the square of the adjusted collapsed histogram to (ii) the integral of the adjusted collapsed histogram. A "signal to noise ratio" or "SNR" sharpness metric may be defined as the ratio of (i) the difference between (a) the mean of the adjusted collapsed histogram over a small set of range bins (e.g., a number of bins corresponding to 5 m of range) centered on the peak (e.g., as estimated using a Gaussian fit) and (b) the mean of the adjusted collapsed histogram over a second set of range bins excluding the peak (e.g., excluding a set of bins corresponding to 15 m of range, centered on the peak) and (ii) the standard deviation of the adjusted collapsed histogram over the second set of range bins.

In another embodiment, the range rate of the target may be estimated from the difference between the pulse repetition frequency and the return pulse arrival frequency. A target that is approaching the ladar system of FIG. 1, for example, will produce a sequence of return pulses that are separated by smaller intervals than the outgoing pulses, because each pulse travels a shorter round trip distance, from the laser transmitter 100 to the target and back to the camera 110, than the previous pulse. Written as an equation, this may be expressed as follows:

$$\Delta f \approx \frac{2\dot{r}}{c} F_s,$$

where $\Delta f$ is the difference between the pulse repetition frequency $F_s$, and the return pulse arrival frequency, $\dot{r}$ is the range rate, and c is the speed of light.

Accordingly, the target range rate may be estimated from the return pulses by estimating their frequency. Each frame set array includes a plurality of consecutive frames, each of which includes a plurality of bins corresponding to the range gate. As mentioned above, the bin slices may be summed in each frame to form a respective array referred to herein as a "range histogram" for the frame. A chipping algorithm may then be used (as described in further detail below) to discard from each frame bins that are not likely to contain any signal reflected from the target, to form an array, for each frame, referred to herein as a chipped range histogram. Each chipped range histogram may have a length equal to the number of bins not discarded in chipping, or it may have a length corresponding to the length of the range gate, with the remaining array elements (corresponding to discarded bins) being set to zero.

A sparse one dimensional array, referred to herein as the "time series", or "time series array" may then be formed by concatenating the chipped range histograms with intervening arrays of zeros so that the array index corresponds to arrival time at the camera 110. This array may be stored explicitly, e.g., in a sequence of memory locations within or coupled to the processing circuit 140, or it may be stored in one of various methods of storing sparse arrays that may use memory more efficiently and that may result in more efficient computations. For example, only the chipped range histograms may be stored, each being stored with an index value indicating where in the time series the first element of the chipped range histogram belongs.

The return pulse arrival frequency may then be estimated by the processing circuit 140 iteratively by adjusting a tentative frequency and evaluating an objective function that measures how well a superposition of a sine and a cosine fits the sparse one dimensional array. For each tentative frequency, two Fourier coefficients may be calculated by the processing circuit 140: (i) a cosine coefficient equal to the (numerical) integral of the product of the time series with a cosine at the tentative frequency, and (ii) a sine coefficient equal to the (numerical) integral of the product of the time series with a sine at the tentative frequency. The frequency of the return pulses may then be estimated by the processing circuit 140 by performing a numerical maximization (e.g., using an extremum-finding method such as a gradient descent method, Brent's algorithm, or a golden section search), using the tentative frequency as a variable and using as the objective function the sum of the squares of the sine coefficient and the cosine coefficient. A completion criterion may be met, for example, when the fractional improvement in the objective function over that of the previous iteration is below a threshold, e.g., 0.0001. In some embodiments the threshold is adjustable and is selected depending on various conditions, and may be greater or smaller than 0.0001.

Figure 4A:
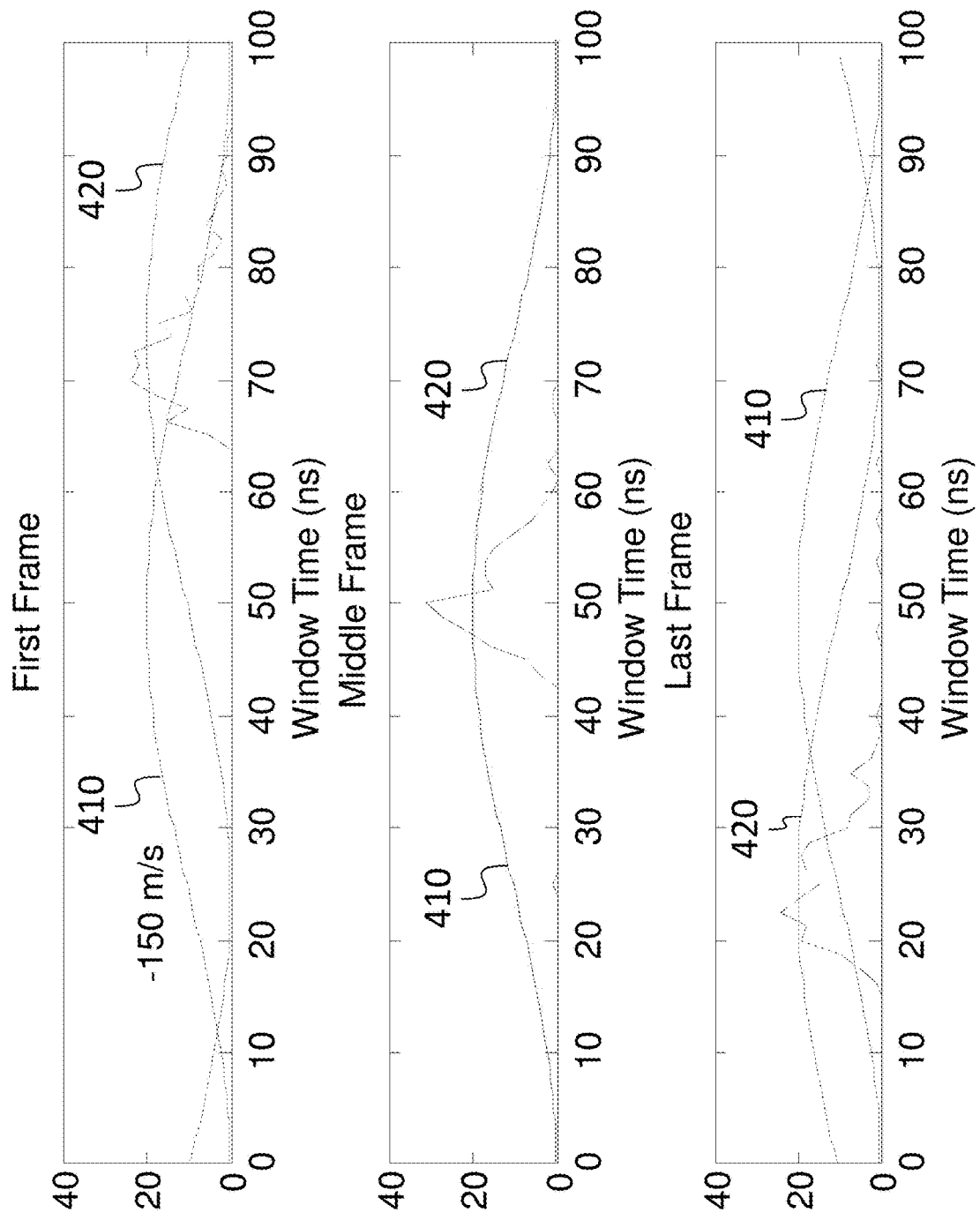
FIG. 4A is a set of three graphs of pulses and cosine fits, according to an embodiment of the present invention.

In some embodiments the chipped frames are concatenated without padding, resulting in a time-compressed time record. The apparent frequency may then be determined by the chip size used. For example, FIG. 4A shows three ladar return pulses (in three corresponding chipped time records, concatenated without padding), with (i) a superposition of a sine and a cosine, both at the pulse repetition frequency (illustrated in curves 410), and (ii) a cosine at the tentative frequency corresponding to the pulse repetition frequency shifted by an amount corresponding to a range rate of −150 m/s (illustrated in curves 420). In the example of FIG. 4A, a 100 ns chip length was used, corresponding to a 10 MHz equivalent PRF. The frequency corresponding to the pulse repetition frequency shifted by an amount corresponding to a range rate of −150 m/s can be seen to provide a better fit and accordingly will result in a larger value for the sum of the squares of the sine coefficient and the cosine coefficient.

Figure 4B:
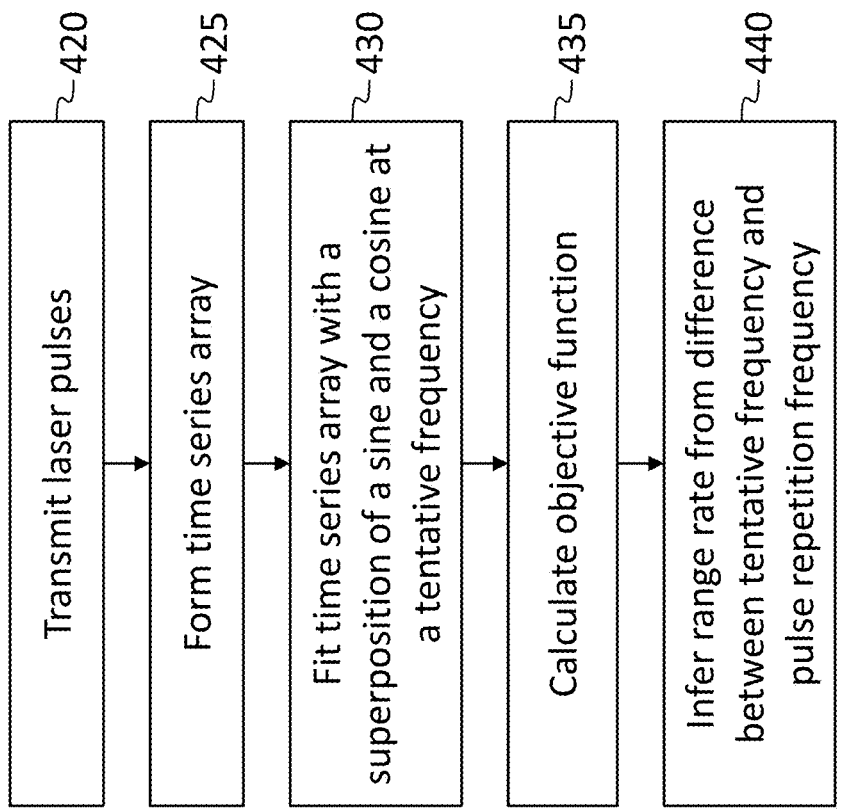
FIG. 4B is a flow chart of a method for estimating a range rate, according to an embodiment of the present invention.

FIG. 4B is a flowchart summarizing this method of range rate estimation. In an act 420, a series of laser pulses is transmitted, and a one-dimensional time series array may be formed, in an act 425, based on the detection times of the electrical pulses generated by detected photons. The time series array may be padded with zeros so that each array element has an index proportional to time, or it may be compressed, i.e., formed by concatenating chipped time records without padding. The time series may then be fit, in an act 430, with a superposition of a sine and a cosine at a tentative frequency, and an objective function, that may measure the goodness of fit, may be calculated, in an act 435. The fitting may involve multiplying the time series array by the cosine of the tentative frequency and integrating the product numerically to calculate a cosine coefficient, and multiplying the time series array by the sine of the tentative frequency and integrating the product numerically to calculate a sine coefficient. The calculating of the objective function may involve calculating the sum of (i) the square of the cosine coefficient and (ii) the square of sine coefficient. Acts 430 and 435 may be repeated with different values of the tentative frequency until a completion criterion is satisfied (e.g., when the objective function exceeds a threshold). The range rate may then be inferred, as discussed in detail above, from the difference between the final value of the tentative frequency, and the pulse repetition rate, according to the following equation:

$$\Delta f \approx \frac{2\dot{r}}{c} F_s.$$

The method of this embodiment may exhibit better performance than alternatives such as, e.g., computing a fast Fourier transform (FFT) of the time record, and finding the peak value of the magnitude of the FFT, because the FFT may have fixed resolution, whereas the resolution or precision of the method of this embodiment may be limited only by the number of iterations used to refine the estimate, in the extremum-finding process.

In some embodiments, a target which is a rigid body may be moving in a cross-range direction, and a target may be rotating, in addition to moving in the range direction as considered above. In such a situation, averaging together the data from a plurality of frames may result in a blurred image of the target, even if, before the averaging, an adjustment is made to each frame to compensate for the range rate of the target. Accordingly, in some embodiments, adjustments are made to compensate for motion in one or more of the five additional degrees of freedom (in addition to range) in which the target may move. These degrees of freedom include two translational degrees of freedom in respective cross-range range directions, and three rotational degrees of freedom. As used herein, the "pose" of the target refers to a six-dimensional quantity defining the position and attitude of the target.

In one embodiment, an input to a method for motion compensation is a frame set array, corresponding to an interval of time during which the pose of the target may have changed enough that straight averaging of the frames would result in significant blurring.

Figure 5:
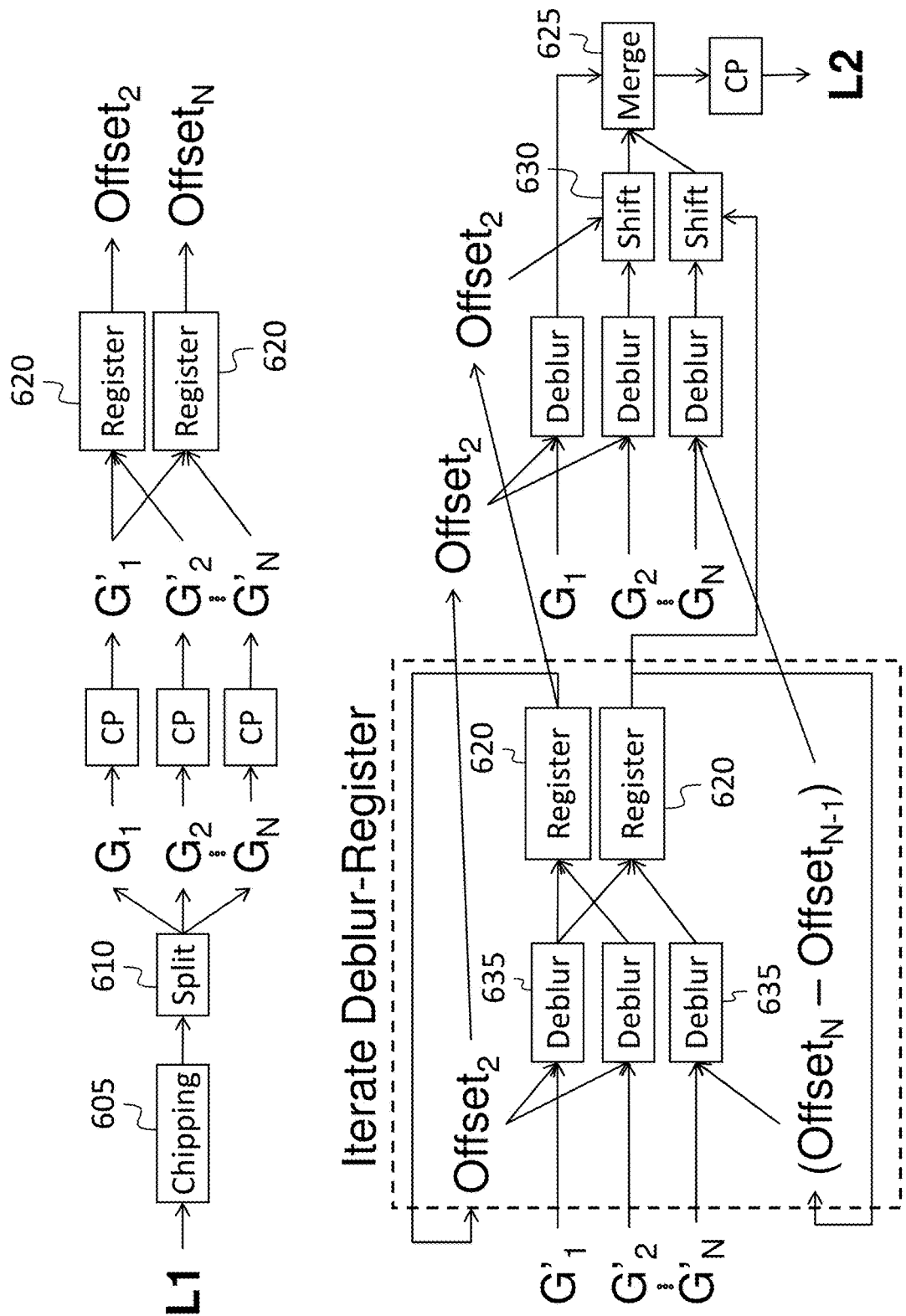
FIG. 5 is a block diagram of an iterative registration deblurring process, according to an embodiment of the present invention.

Referring to FIG. 5, a frame set array may be formed from a plurality of ROIC output arrays each of which may first be reduced using a chipping process 605. Each frame of the frame set array may be converted to a "Level 1" three dimensional (3D) point cloud (identified as "L1" in FIG. 5), in which each point represents a pulse generated by the photodiode array 120, the cross-range coordinates of the point being proportional to the coordinates on the photodiode array 120 of the pixel that generated the pulse, and the range coordinate being proportional to the round-trip travel time (i.e., the time between the emission of the laser pulse corresponding to the frame, and the generation of the pulse).

The frames may be divided or split, in a step 610, into N groups (identified in FIG. 5 as $G_1$, $G_2$ . . . $G_N$), with each group including a contiguous subset of the frames. For example, if the frame set array includes 1000 frames, the frames may be grouped into 50 groups of 20 frames each, with the first group including, for example, the first 20 frames in the frame set array, the second group including the $21^{st}$ through $40^{th}$ frames, and so on. The number of frames in each group may be selected based on the competing advantages of achieving improvements in signal to noise through averaging (which is better achieved with a larger group) and of minimizing motion blur within the group (which is better achieved with a smaller group).

Within each group $G_1$, $G_2$ . . . $G_N$, coincidence processing (CP) may be employed to suppress noise. Each point cloud may be divided into three dimensional regions (e.g., regions each having the shape of a rectangular parallelepiped or box, or of a cube) referred to herein as voxels. Each voxel may consist for example of a cube having a side length of 4 pixels (in the cross range dimensions, and a similar size, in meters, in the range dimension). The number of pulses in each voxel in the frame may be counted, and, if it falls below a threshold, all of the array elements within the voxel may be set to zero for each frame in the group. This processing may result in suppressing noise more than signal, because noise may be less likely to produce pulses at the same (or nearly the same) point in successive frames than ladar return photons. In some embodiments, a coincidence processing method employing a different algorithm is used.

An average point cloud may be formed for each of the groups of frames after coincidence processing (identified in FIG. 5 as $G_1'$, $G_2'$ . . . $G_N'$) and the average point clouds $G_1'$, $G_2'$ . . . $G_N'$ may then be pairwise registered using a registration process 620, each pair consisting of the first group, and one of the remaining groups, with, e.g., the $N^{th}$ pair consisting of the $G_1'$ and $G_N'$. The symbols $G_1$, $G_2$ . . . $G_N$ and $G_1'$, $G_2'$ . . . $G_N'$ are used herein to refer to the groups of frames, or to the corresponding average point clouds. An iterative closest point (ICP) algorithm may be used as the registration process, for example. The result of the registration process may be a 6-dimensional transformation (or "Offset" in FIG. 5) that approximately transforms the point cloud of the first group of each pair of groups (the "first point cloud") to the point cloud of the second group of each pair of groups (the "second point cloud"). Each such transformation may, for example, be represented as (i) a vector representing the translational portion of the transformation and (ii) a set of rotation angles (e.g., three Euler angles) or a quaternion representing the rotational portion of the transformation. Range rate compensation may be performed separately, e.g., using one of the methods described above, with the result that the input frame set array may be the output of a range rate compensation process, and that the range component of the transformation may be relatively small.

The registration process may, as mentioned above, involve performing an ICP algorithm, which may involve the steps of (i) for each point in the first point cloud, finding the closest point in the second point cloud, (ii) estimating the transformation (i.e., the combination of rotation and translation) that best aligns (as assessed by a mean squared error cost function) each point in the first point cloud to its match (found in the previous step) in the second point cloud, (iii) transforming the points of the first point cloud using the estimated transformation, and (iv) repeating steps (i) through (iii), until a first completion criterion is satisfied (e.g., until the incremental improvement in the cost function falls below a threshold, or until the match of each point in the first point cloud is the same as it was during the preceding iteration).

From each transformation, an estimated 6-dimensional velocity (including a translational velocity and a rotational, or angular, velocity) may be calculated by dividing the transformation by the time interval between the centers of the two groups of any of the pairs of groups.

After the registration process is completed, an average 6-dimensional velocity (including a translational velocity and a rotational, or angular, velocity) may be calculated for each group as the average of (i) the velocity corresponding to the transformation between the preceding group and the group, and (ii) the velocity corresponding to the transformation between the group and the subsequent group. For the first group the average velocity may be the velocity corresponding to the transformation between the group and the subsequent (i.e., second) group, and for the last group the average velocity may be the velocity corresponding to the transformation between the preceding group (i.e., the second-last group) and the group. Each of the groups of point clouds (corresponding to the groups of frames) may be then be deblurred, in a deblurring operation 635, by transforming each point cloud after the first point cloud in the group with a transformation calculated to be proportional to (e.g., equal to a negative constant times) the product of the average velocity for the group and the time interval between the point cloud and the first point cloud in the group. Each point cloud in the group of point clouds may be numbered, in consecutive order, with an index, the first point cloud having index 0, the second point cloud having index 1, and so forth; in this case the time interval between the point cloud and the first point cloud in the group may be proportional to the index of the point cloud within the group of point clouds. The process of deblurring each group and registering the groups pairwise may be repeated. After each iteration the blurring due to object motion may be further reduced as the accuracy of the velocity estimates improve, and the accuracy of the velocity estimates may improve as a result of the reduced blurring of the point clouds used to obtain them. The iterations may be repeated until a second completion criterion is satisfied (e.g., when a measure of the change in the transformations from the previous iteration is less than a threshold value). The point clouds may then all be merged, in an operation 625, into a single "Level 2" (or "L2") point cloud. This merging may be accomplished, for example, by first transforming (in a "Shift" operation 630) each deblurred point cloud, with, for example the $k^{th}$ point cloud (i.e., $G_k'$) being transformed with a transformation that is the inverse of the transformation corresponding to the estimated change in attitude from the first point cloud $G_1'$ to the $k^{th}$ point cloud. A merged point cloud, consisting of all of the points of the transformed deblurred point clouds, may then be formed.

Various methods may be used to perform the chipping operation mentioned above (e.g., the chipping operation 605 of FIG. 5, and the chipping operation that may be used to form chipped range histograms from range histograms, resulting, e.g., in the range versus frame image of FIG. 2A). A chipping algorithm may be an algorithm that selects a portion (e.g., a contiguous subset of the elements) of a range histogram, the portion being centered on an element corresponding to an initial estimate of a range to the target.

Figure 6:
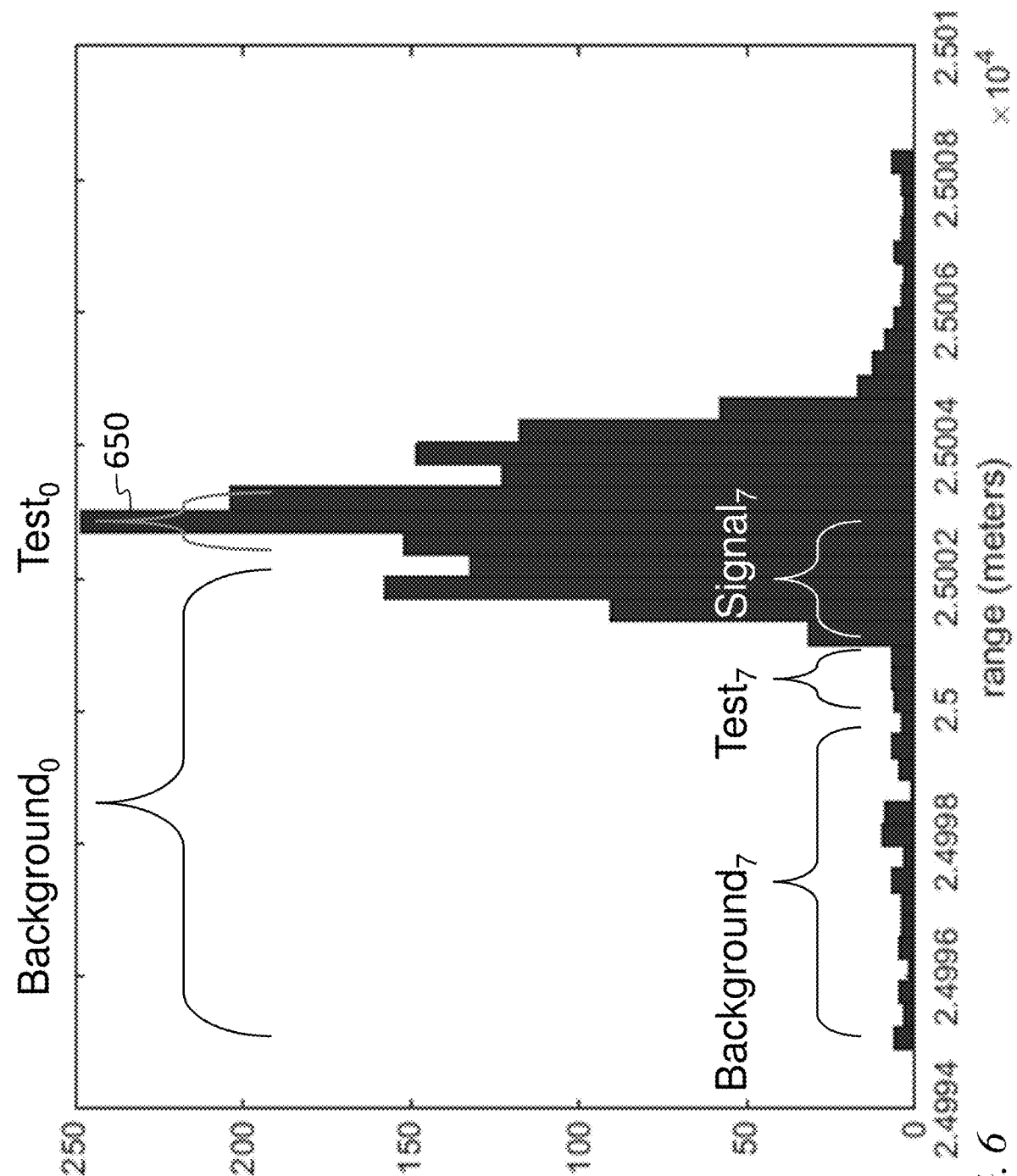
FIG. 6 is an illustration of a chipping process, according to an embodiment of the present invention.

In some embodiments, the chipping operation includes forming a preliminary range estimate, and selecting a set of bins centered on the preliminary range estimate. In one embodiment, a coarse range histogram may be formed, by summing the elements of range histograms within respective groups whose extent corresponds to the expected target size and motion. The coarse range histogram may be cropped and sharpened, e.g., with a finite impulse response filter having coefficients of [−0.5, 1, −0.5]. A peak may be found in the sharpened histogram. A subset of the original range histogram may then be selected, centered on the peak found using the coarse range histogram. Referring to FIG. 6, this range histogram may have a peak (i.e., a maximum value in a first bin) 650. A relatively small test interval, including, e.g., 3 bins, may be set initially to be centered on the peak bin; the first test interval is labeled "$Test_0$" in FIG. 6. A left background interval may be defined to be all of the bins to the left of the test interval (e.g., initially being the interval "$Background_0$"). The test interval may then be progressively moved to the left; once the peak bin is no longer within the test interval, a signal interval, "$Signal_7$" for example, may be defined to include the peak bin and the bins, if any, to the right of the test interval (e.g., "$Test_7$") and to the left of the peak bin. An objective function may be defined to be the ratio of (i) the difference between the mean of the bins in the test interval and the mean of the bins in the background interval, and (ii) the mean of the bins in the signal interval. The test interval may then be progressively moved to the left until the value of the objective function falls below a threshold, e.g., 0.05. This may be written as follows:

$$(\text{mean}(Test n) - \text{mean}(Background n))/\text{mean}(signal n) < 0.05$$

where Testn (or $Test_n$) is a contiguous set of k bins, k being an integer greater than 1, Signaln (or $Signal_n$) is a contiguous set of bins beginning immediately to the right of Testn and extending to a peak bin having the largest value in the histogram array, Backgroundn (or $Background_n$) is a contiguous set of bins beginning immediately to the left of Testn and extending to the left edge of the range histogram array, and the mean( ) function refers to an average of a set of bins that is the argument of the function.

One of the bins of the test interval (e.g., the left-most bin) may then be used as the left boundary of the portion of the frame not discarded by the chipping algorithm. An analogous process may be used to find the right boundary.

In another embodiment, chipping may be performed, if an initial value for the expected ladar range extent of the target is available, as follows. The range bin with the largest number of counts may be found, and then all of the range bins having at least 50% of this largest number of counts may be identified. All range bins farther than expected target size (i.e., half of the expected ladar range extent of the target) away from the peak range bin may be eliminated, and a full width at half maximum (FWHM) may be calculated as the extent of the remaining range bins. A background may be defined as all range bins that are more than four times the FWHM away from the peak range bin, and the background offset and noise may be defined as the mean and standard deviation of the background, respectively. The SNR of each range bin may be calculated as (y−offset)/noise where y is the number of counts in the range bin. The target size may be defined as the extent of range bins with SNR greater than 5.0, and the target range may be defined as the weighted average (by counts per bin) of the target range bins. The chipping algorithm may then discard (e.g., set to zero) all bins that are more distant from the bin at the target range than one half of the target size.

In some embodiments, background subtraction may be performed as a preliminary step before performing chipping, e.g., as described above. A range histogram may be fitted to an exponential background model (in which the background is modeled as being proportional to exp(a+br)). The fit may be performed via a linear regression to the logarithm of the range histogram. This exponential model describes range distribution of Geiger mode pulses in the presence of constant background flux and takes into account the gradual loss of sensitivity during each frame as pixels are disabled by noise pulses. The modeled background may be subtracted from the range histogram.

In another embodiment, a three-dimensional chipping algorithm may be used to eliminate signal that is too distant from the center of the target in the range direction or in either of the cross-range directions to correspond to reflections from the target, as follows. An uncertainty volume may be defined by a bounding box defined by minimum and maximum azimuth, elevation, and range values in which target may reside (given prior knowledge about the target). Dimensions may then be defined for each of a plurality of "macrovoxels"; these dimensions may be azimuth, elevation, and range extents corresponding to nominal target size, enlarged by the maximum expected motion during the collection time. The uncertainty volume may then be divided into a dense, non-overlapping, three dimensional grid of macrovoxels. An accumulation array may be initialized, with one array element for each macrovoxel. For each detection in the collected data, it may be determined which (if any) macrovoxel it falls into, and, accordingly, a count may be accumulated for each macrovoxel. Any detections that are outside the uncertainty volume may be ignored. The macrovoxel with the most counts may then be found. Optionally, the algorithm may also check that this count exceeds a threshold; otherwise, it may declare that "no target" was found. The macrovoxel with the most counts may then be used as the three dimensional "chip", and further processing may be restricted to the detections within this chip.

Embodiments of the present invention may be used to estimate the range and range rate of a target, to estimate the cross-range velocity and angular velocity of the target, and to generate images of the target. The results may be used for various purposes, such as displaying the results, graphs of the results, or resulting images on a display for the use of an operator, or to identify the target using target identification algorithms, or to rendezvous with the target or intercept the target.

The term "processing circuit" is used herein to include any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed wiring board (PWB) or distributed over several interconnected PWBs. A processing circuit may contain other processing circuits; for example a processing circuit may include two processing circuits, an FPGA and a CPU, interconnected on a PWB.

Although limited embodiments of a system and method for operating a ladar have been specifically described and illustrated herein, many modifications and variations will be apparent to those skilled in the art. Accordingly, it is to be understood that a system and method for operating a ladar employed according to principles of this invention may be embodied other than as specifically described herein. The invention is also defined in the following claims, and equivalents thereof.

What is claimed is:

1. A method for forming a range rate estimate for a target with a laser detection and ranging system comprising a laser transmitter and an array detector, the method comprising:
    transmitting a plurality of laser pulses at a pulse repetition frequency;
    forming a one dimensional time series array corresponding to a time record of ladar return photons detected with the array detector;
    fitting the time series array with a superposition of a sine and a cosine of an initial value of a tentative frequency;
    iteratively fitting the time series array with a superposition of a sine and a cosine of the tentative frequency, and adjusting the tentative frequency until a completion criterion is satisfied at a final value of the tentative frequency; and
    calculating the range rate estimate as the ratio of:
        a product of the speed of light and a difference between a final value of the tentative frequency and the pulse repetition frequency; and
        twice the pulse repetition frequency.

2. The method of claim 1, wherein iteratively fitting the time series array with a superposition of a sine and a cosine of a tentative frequency comprises:
    multiplying the time series array by the cosine of the tentative frequency and integrating the product numerically to calculate a cosine coefficient;
    multiplying the time series array by the sine of the tentative frequency and integrating the product numerically to calculate a sine coefficient;
    calculating an objective function from the cosine coefficient and the sine coefficient; and
    adjusting the tentative frequency to an updated value at which a value of the objective function is increased.

3. The method of claim 2, wherein the adjusting of the tentative frequency comprises adjusting the tentative frequency using a golden section search.

4. The method of claim 2, wherein the objective function is equal to the sum of:
    the square of the cosine coefficient; and
    the square of sine coefficient.

5. The method of claim 2, wherein the completion criterion is satisfied when the value of the objective function increases by less than a threshold amount during one iteration.

6. The method of claim 5, wherein the threshold amount is 0.01 percent of the value of the objective function.

7. The method of claim 1, wherein forming a one dimensional time series array comprises:
    for each transmitted laser pulse:
        detecting, with an array detector, a plurality of ladar return photons from the laser pulse, each detection producing an electrical pulse;
        identifying, for each of the electrical pulses, a bin, of a plurality of time bins corresponding to the laser pulse, within which the electrical pulse was produced; and
        forming a one dimensional range histogram array having, for each bin of the plurality of bins, an element with a value equal to the number of electrical pulses produced in the array detector during a time interval corresponding to the bin; and
    concatenating:
        respective portions of the range histogram arrays; and
        a plurality of one dimensional arrays each consisting of a plurality of zeros,
        to form the one dimensional time series array, each nonzero element of the time series array being the number of pulses produced in a time interval at a time corresponding to the position of the nonzero element in the time series array.

8. The method of claim 7, wherein each respective portion of each range histogram array is a contiguous subset of the elements of the range histogram array selected to include a range of elements centered on an element corresponding to an initial estimate of a range to the target.

9. The method of claim 8, wherein the contiguous subset is selected from a range histogram array by finding a first test subset of bins, having a left boundary satisfying $$(\text{mean}(\text{Test}n) - \text{mean}(\text{Background}n))/\text{mean}(\text{signal}n) < 0.05$$

wherein:
    Testn is a contiguous set of k bins, k being an integer greater than 1;
    Signaln is a contiguous set of bins beginning immediately to the right of Testn and extending to a peak bin having the largest value in the range histogram array;
    Backgroundn is a contiguous set of bins beginning immediately to the left of Testn and extending to the left edge of the range histogram array;
    the mean( ) function refers to an average of a set of bins that is the argument of the function; and
    left and right refer to earlier and later times, respectively.

10. A ladar system for forming a range rate estimate for a target, the system comprising:
    a pulsed laser transmitter configured to transmit a sequence of laser pulses at a pulse repetition frequency;
    a camera comprising an array detector; and
    a processing circuit,
    the camera and the processing circuit being together configured to form a one dimensional time series array corresponding to a time record of ladar return photons,
    the processing unit being configured to:
    fit the time series array with a superposition of a sine and a cosine of an initial value of a tentative frequency;
    iteratively fit the time series array with a superposition of a sine and a cosine of the tentative frequency, and adjust the tentative frequency until a completion criterion is satisfied at a final tentative frequency; and
    calculate the range rate estimate as the ratio of:
        the product of the speed of light and the difference between a final value of the tentative frequency and the pulse repetition frequency; and
        twice the pulse repetition frequency.

11. The system of claim 10, wherein iteratively fitting the time series array with a superposition of a sine and a cosine of a tentative frequency comprises:

multiplying the time series array by the cosine of the tentative frequency and integrating the product numerically to calculate a cosine coefficient;

multiplying the time series array by the sine of the tentative frequency and integrating the product numerically to calculate a sine coefficient;

calculating an objective function from the cosine coefficient and the sine coefficient; and adjusting the tentative frequency to an updated value at which a value of the objective function is increased.

12. The system of claim 11, wherein the adjusting of the tentative frequency comprises adjusting the tentative frequency using a golden section search.

13. The system of claim 11, wherein the objective function is equal to the sum of:

the square of the cosine coefficient; and the square of sine coefficient.

14. The system of claim 11, wherein the completion criterion is satisfied when the value of the objective function increases by less than a threshold amount during one iteration.

15. The system of claim 14, wherein the threshold amount is 0.01 percent of the value of the objective function.

16. The system of claim 10, wherein forming a one dimensional time series array comprises:

for each transmitted laser pulse:

detecting, by the array detector, of a plurality of ladar return photons from the laser pulse, each detection producing an electrical pulse;

identifying, by the camera, for each of the electrical pulses, a bin, of a plurality of time bins corresponding to the laser pulse, within which the electrical pulse was produced; and forming, by the processing circuit, a one dimensional range histogram array having, for each bin of the plurality of bins, an element with a value equal to the number of electrical pulses produced in the array detector during a time interval corresponding to the bin; and concatenating, by the processing circuit:

respective portions of the range histogram arrays; and a plurality of one dimensional arrays each consisting of a plurality of zeros, to form the one dimensional time series array, each nonzero element of the time series array being the number of pulses produced in a time interval at a time corresponding to the position of the nonzero element in the time series array.

17. The system of claim 16, wherein each respective portion of each range histogram array is a contiguous subset of the elements of the range histogram array selected to include a range of elements centered on an element corresponding to an initial estimate of a range to the target.

18. The system of claim 17, wherein the contiguous subset is selected from a range histogram array by finding a first test subset of bins, having a left boundary satisfying (mean(Test$n$)−mean(Background$n$))/mean (signal$n$)<0.05 wherein:

Testn is a contiguous set of k bins, k being an integer greater than 1;

Signaln is a contiguous set of bins beginning immediately to the right of Testn and extending to a peak bin having the largest value in the range histogram array;

Backgroundn is a contiguous set of bins beginning immediately to the left of Testn and extending to the left edge of the range histogram array;

the mean( ) function refers to an average of a set of bins that is the argument of the function; and left and right refer to earlier and later times, respectively.

* * * * *